United States Patent [19]
Fujita et al.

[11] Patent Number: 5,869,567
[45] Date of Patent: Feb. 9, 1999

[54] POLYESTER RESIN AQUEOUS DISPERSION AND PROCESS FOR PREPARING THE SAME

[75] Inventors: Eiji Fujita; Tetsuya Miyagawa; Kenjin Shiba; Jinhua Xu; Kiyomi Hata, all of Kyoto, Japan

[73] Assignee: Unitika Ltd., Hyogo, Japan

[21] Appl. No.: 812,433

[22] Filed: Mar. 7, 1997

[30] Foreign Application Priority Data

Mar. 8, 1996 [JP] Japan .................................. 8-051362

[51] Int. Cl.⁶ .............................. C08K 3/20; C08G 63/16
[52] U.S. Cl. .......................... 524/608; 528/272; 528/302; 528/308; 528/308.6; 528/491; 528/492; 528/493; 528/494; 528/495; 524/601; 524/605; 524/607; 524/800; 524/801; 524/803; 523/500; 523/501
[58] Field of Search ...................... 528/272, 302, 528/308, 308.6, 491, 492, 493, 494, 495; 524/601, 605, 607, 608, 800, 801, 803; 523/500, 501

[56] References Cited

U.S. PATENT DOCUMENTS 4,122,055 10/1978 Tugukuni et al. .................... 523/409
4,340,519 7/1982 Kotera et al. ........................ 523/414

FOREIGN PATENT DOCUMENTS

A10520266 12/1992 European Pat. Off. .
1528221 10/1978 United Kingdom .

OTHER PUBLICATIONS

Technology of Paints, Varnishes and Lacquers, *Emulsion Paints*, C.R. Martens, pp. 513–521.

*Primary Examiner*—Samuel A. Acquah
*Attorney, Agent, or Firm*—Sughrue, Mion, Zinn, Macpeak & Seas, PLLC

[57] ABSTRACT

A polyester resin aqueous dispersion which provides a coating film having excellent processability, water resistance, corrosion resistance, chemical resistance, weather resistance and adhesion to various substrates, and which also has markedly excellent storage stability even at a high solids concentration. The polyester resin aqueous dispersion substantially comprises a specific polyester resin, a basic compound, an amphipathic organic solvent capable of plasticizing the polyester resin, and a compound having a protective colloid action. Furthermore, fine particles of the polyester resin are homogeneously dispersed in an aqueous medium and in a specific dispersed state.

20 Claims, 3 Drawing Sheets

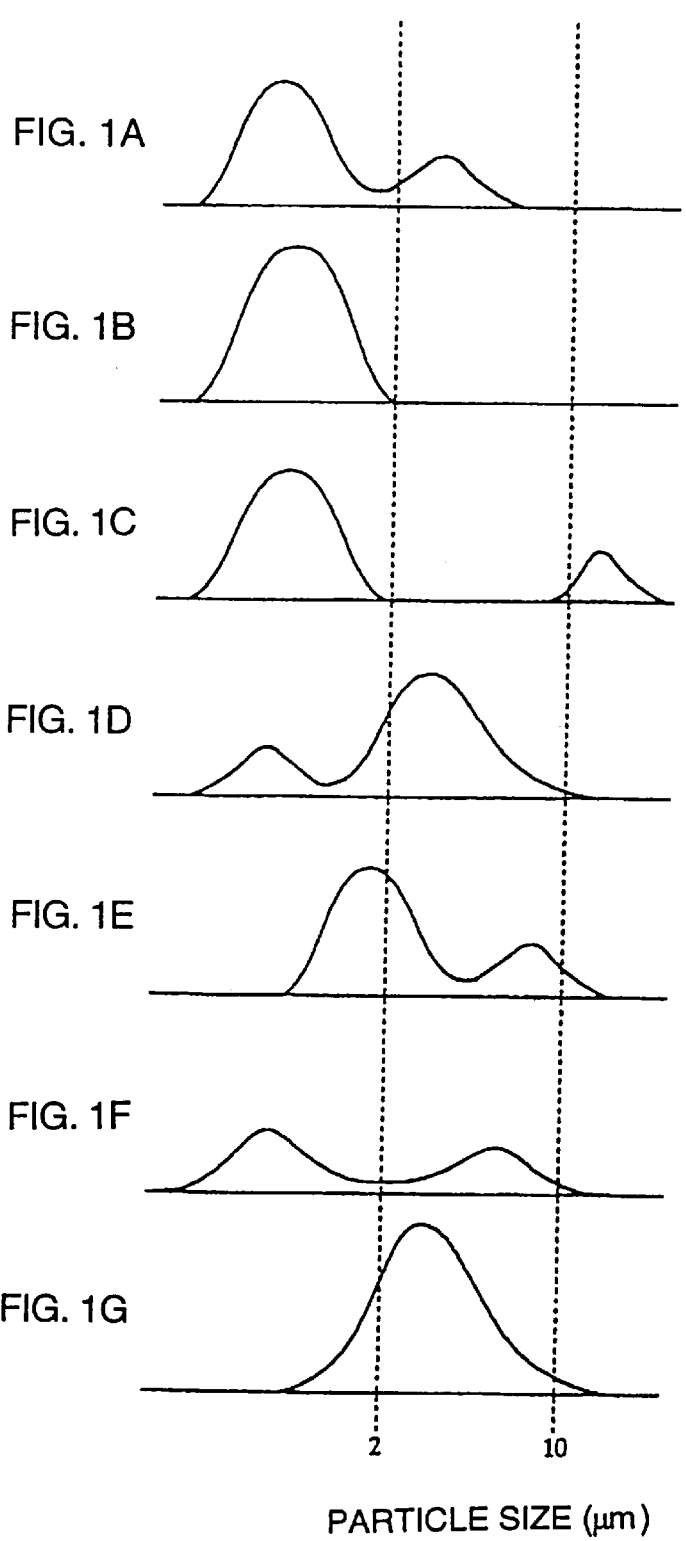

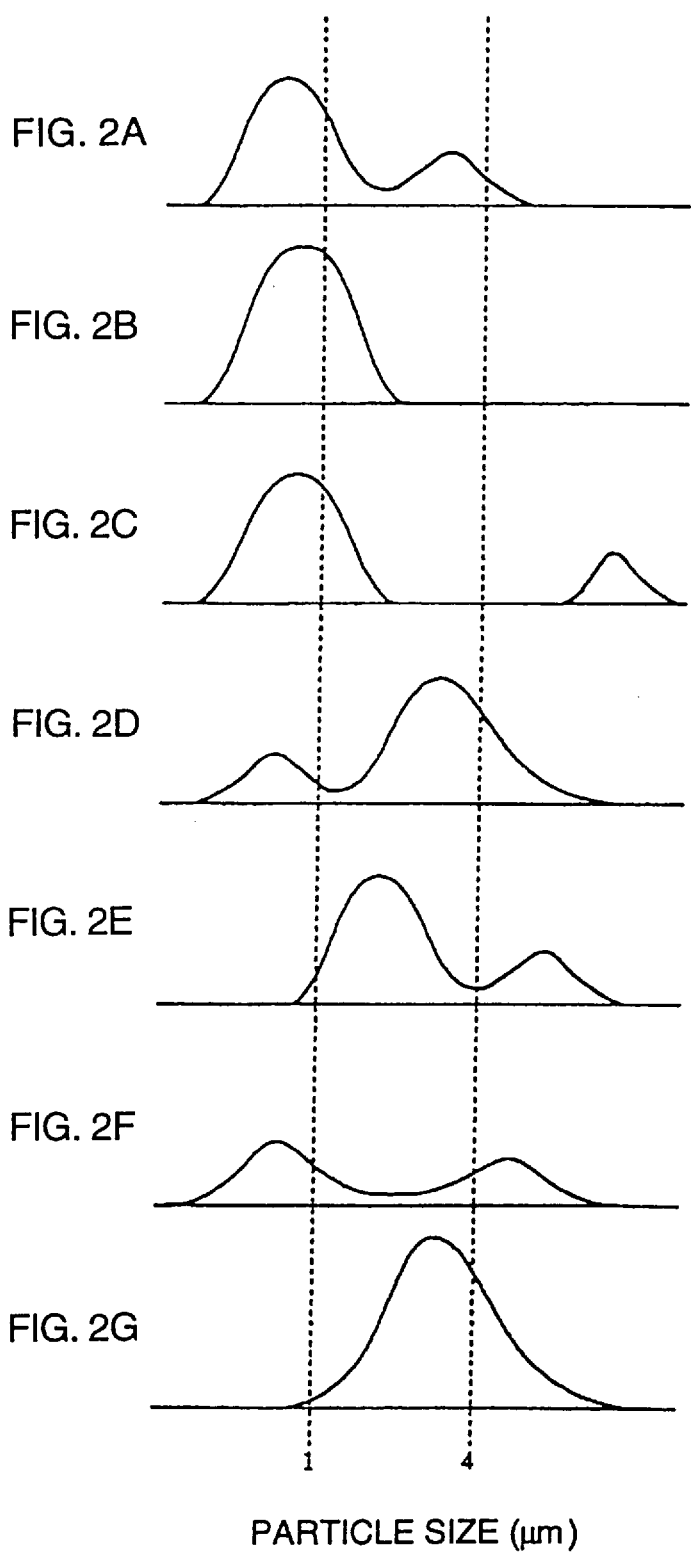

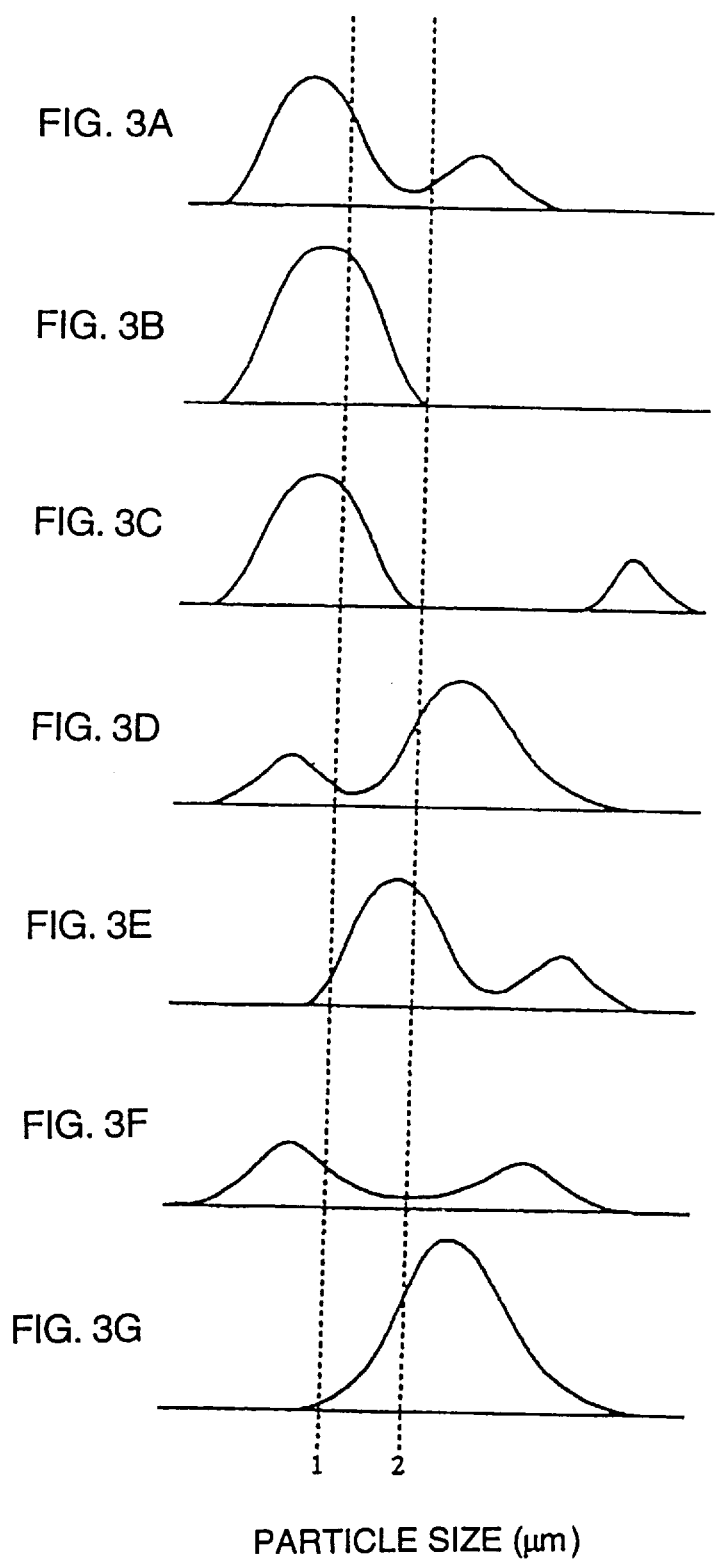

POLYESTER RESIN AQUEOUS DISPERSION AND PROCESS FOR PREPARING THE SAME

FIELD OF THE INVENTION

This invention relates to a polyester resin aqueous dispersion and a method for preparing the same.

BACKGROUND OF THE INVENTION

High-molecular weight polyester resins comprising a polybasic acid(s) and a polyhydric alcohol(s) (i.e., so-called oil-free alkyd resins) have been extensively used not only as fiber, film, and molding materials, but also as binders in the fields of paint, ink, adhesives and coatings. This is because of the satisfactory properties of these high-molecular weight polyester resins in dispersing pigments and in providing a coating film having excellent processability, chemical resistance, weather resistance and adhesion to various substrates. It is well known that the processability, water resistance, chemical resistance and weather resistance of a coating film formed of the high-molecular weight polyester resin can be improved without impairing the other physical properties of the film by employing aromatic polybasic acids, especially terephthalic acid, as an acid component of the polyester.

However, as the amount of aromatic polybasic acids (especially terephthalic acid) as a proportion of the total acid components increases, the polyester resin becomes less soluble in common organic solvents when the concentration of the resin is high, and therefore cannot be shaped in a fluid state. This severely limits the applicability of the resin. Thus, the development of a technique of fluidizing such resins in high concentration has been desired for a long time.

From the viewpoint of environmental and resource conservation, hazardous substance regulations, and improvement in the working environment, there has recently been an appreciable tendency to replace the organic solvent liquidization with an aqueous medium liquidization which means dissolving or dispersing a resin in an aqueous medium in order to be shaped. The same applies to polyester resins. In particular, an aqueous dispersion of a high-molecular weight polyester resin containing an aromatic polybasic acid component in a large proportion, especially a terephthalic acid component, is expected not only to form a coating film having excellent performance properties but also to exhibit excellent storage stability because of the hydrolysis resistance of this type of resin skeleton.

One method for dispersing a high-molecular weight polyester resin in aqueous medium comprises emulsifying a resin by dissolving in an organic solvent or melting, adding the solution or molten resin to an aqueous medium while imparting a high-speed shear to finely divide the resin, and stabilizing a dispersion of the resin with the aid of a dispersion stabilizer, such as a surfactant (called a forced emulsification method, hereinafter referred to as method A). Since the resin itself is hydrophobic, this method requires the use of a large quantity of a low-molecular weight hydrophilic surfactant in order to stabilize the dispersed fine particles. As a result, the coating film formed of the resin dispersion thus obtained has inferior water resistance. On the other hand, JP-B-59-30186 (the term "JP-B" as used herein means an "examined Japanese patent publication"), JP-B-60-1334, JP-B-61-58092, JP-B-62-19789, JP-B-62-21380, and JP-B-62-21381 disclose a water-borne polyester resin, which is characterized by using a monomer having a metal sulfonate group (e.g., 5-sodium sulfoisophthalic acid) to introduce a metal sulfonate group which is a powerful hydrophilic group, into the polyester resin (method B). According to this method, since the hydrophilic group is incorporated into the resin, the resin can be easily dissolved or dispersed in an aqueous medium even though the content of the hydrophilic group is small. However, the above ionic group remains in the coating film after drying. This makes the film less resistant to water, corrosion and chemicals.

Yet another method for dispersing a polyester resin in an aqueous medium comprises synthesizing a polyester resin having a high acid value, neutralizing the carboxyl groups of the resin with a volatile basic compound, such as an organic amine compound, to form ionic hydrophilic groups in the resin (method C). Since the basic compound used in this method volatilizes while the coating film is dried, the resulting coating film has excellent water resistance, corrosion resistance and chemical resistance.

Method (C) includes (1) a method of dissolving the resin in an organic solvent or melting the resin, and adding the resin to an aqueous medium while imparting a shear force to obtain a fine dispersion in which the formed fine resin particles are stabilized by electric repulsion of the neutral salt to thereby prevent flocculation of fine resin particles (self-emulsification method), (2) a method of dissolving a resin in an organic solvent and pouring an aqueous medium into the solution while stirring to induce phase inversion from a W/O emulsion to an O/W emulsion, to thereby prepare a stable aqueous dispersion (phase inversion method), and (3) a method of mechanically grinding a polyester resin into fine particles and homogeneously dispersing the particles in an aqueous medium (slurry paint or aqueous slurry paint). As a modification of method (1), a method (4) is also known in which the liquidized resin of method (1) is finely divided by atomizing into an aqueous medium under high pressure.

However, each of the above-mentioned methods are problematic when applied to a high-molecular weight polyester resin containing an aromatic polybasic acid component (especially, a terephthalic acid component) in a large proportion. Thus, it has heretofore been impossible to obtain an aqueous dispersion in which the fine particles of such a polyester resin are stably dispersed in an aqueous medium in a high concentration. This type of polyester resin is not soluble in common organic solvents at a high solid concentration. Accordingly, an aqueous dispersion thereof, even if obtained by any of methods (1), (2) and (4) above, should contain a large amount of an organic solvent which deviates from what is essentially required from a water liquidization technique. On the other hand, JP-A-60-248734 and JP-A-60-248735 (the term "JP-A" as used herein means an "unexamined published Japanese patent application") disclose a method in which a resin is dissolved in a specific organic solvent having a boiling point of 100° C. or lower, and a part or all of the organic solvent is then removed from the O/W emulsion obtained by the method (2). However, the present inventors found that it is impossible to stably dissolve the polyester resin in such a specific organic solvent in a concentration of 50% by weight or higher even when accompanied by refluxing. Furthermore, the step of solvent removal requires not only a considerable amount of time and energy, but also a large quantity of a hydrophilic compound, such as a surfactant, so as to prevent flocculation of the resin particles during the solvent removal step.

With respect to the method of directly contacting a molten polyester resin with an aqueous medium, a danger is involved in emulsifying. This is because a molten polyester resin generally does not have sufficient flowability unless it is heated to 200° C. or higher. Additionally, the polyester resin may markedly hydrolyze upon contact with the aqueous medium at high temperatures.

With regard to method (3), although various improvements have been proposed for securing dispersion stability of the resin particles, it is difficult to obtain fine particles having an average particle size of not greater than 1 μm by mechanical grinding. Namely, this results in resin particles having a broad particle size distribution.

Therefore, the resulting aqueous dispersion does not have sufficient storage stability. Moreover, a coating film obtained therefrom has poor gloss, and a thin film cannot be formed.

SUMMARY OF THE INVENTION

In view of the above described problems of the prior art, an object of the present invention is to provide a polyester resin aqueous dispersion having the following characteristics: (1) the polyester resin does not contain a special monomer component, or a structure which leaves an ionic group in a dried film formed of the dispersion, or an easily hydrolyzable structure; (2) the dispersion does not contain an externally added low-molecular weight hydrophilic compound such as a surfactant, and has a sufficiently reduced organic solvent content; (3) the dispersion exhibits extremely high storage stability even at a high solid concentration; (4) the dispersion provides excellent film-forming properties; and (5) a coating film formed from the dispersion has excellent performance properties, such as processability, water resistance, corrosion resistance, chemical resistance, weather resistance and adhesion to various substrates. The advantages (1) to (5) are manifest even when the polyester resin contains aromatic polybasic acid components, especially a terephthalic acid component, as the acid component in a large proportion.

Another object of the present invention is to provide a method for producing the above described polyester resin aqueous dispersion having stable qualities without employing special equipment.

A further object of the present invention is to provide a polyester resin aqueous dispersion whose coating film exhibits further improved water resistance as well as the above-described advantages (1) to (5). Yet another object of the present invention is to provide a method for producing the above described polyester resin aqueous dispersion having stable qualities without employing special equipment.

As a result of extensive studies, the present inventors have completed the present invention based on the following findings.

In a self-emulsification method, dispersion stability of polyester resin fine particles is achieved by forming ionic groups (a neutral salt) by contacting the carboxyl groups of the hydrophobic polyester resin with a hydrophilic basic compound. In order to obtain fine particles of the polyester resin and to increase the frequency of the above contact and thereby accelerate the neutralization, prior investigators have accepted as an essential condition that the polyester resin must previously be made liquid and, after contacting the liquid resin (i.e. organic solution or molten of the resin) with an aqueous medium, the system must be stirred vigorously.

To the contrary, the present inventors first discovered that only if the polyester resin has a specific acid value, fine particles of the polyester resins are formed even from the form of pellets or granules of the resin, at a surprisingly high speed of progress, by stirring in an aqueous medium in the presence of a specific organic compound (organic solvent) capable of plasticizing the polyester resin under a prescribed condition and at or above the higher of (i) the glass transition temperature of the resin, and (ii) 60° C. This means that the conventional process of liquidizing the polyester resin is not necessary for the present invention.

The second fact that the present inventors discovered is that the particle size distribution of the polyester resin aqueous dispersion obtained by the above treatment can be controlled to a large degree by adjusting the acid value of the polyester resin, the kind and amount of the organic solvent that is used, the kind and amount of the basic compound that is used, the treatment conditions, and the like.

The third fact that the present inventors discovered is that the storage stability of the polyester resin aqueous dispersion can be markedly improved by optimizing the particle size distribution of the resin particles and by using a specific compound having a protective colloid action in a very small amount. Furthermore, a coating film of the resulting dispersion still provides excellent performance properties inherently possessed by the polyester resin.

The fourth fact that the present inventors discovered is that the water resistance of the coating film obtained from the polyester resin aqueous dispersion can be further improved while retaining the above-described first to third properties by widening the molecular weight distribution of the polyester resin, controlling the acid value of the polyester resin, and restricting the content of the compound having a protective colloid action.

While the inventors' attention has been directed particularly to high-molecular weight polyester resins comprising a large quantity of aromatic polybasic acids, especially terephthalic acid, as an acid component, it has been ascertained that the above-mentioned tendencies are also shown in general polyester resins.

The present invention in a first aspect relates to a polyester resin aqueous dispersion comprising:

(A) a polyester resin comprising a polybasic acid and a polyhydric alcohol and having an acid value of 10 to 40 mg KOH/g, a weight average molecular weight of 9,000 or more, or a relative viscosity of 1.20 or higher, (B) a basic compound, (C) an amphipathic organic solvent capable of plasticizing said polyester resin, in an amount of from 0.5 to 10% by weight based on said polyester resin aqueous dispersion, and (D) a compound having a protective colloid action, in an amount of from 0.01 to 3% by weight based on said polyester resin, wherein fine particles of said polyester resin are homogeneously dispersed in an aqueous medium.

The present invention in a second aspect relates to a method for producing a polyester resin aqueous dispersion comprising the steps of:

roughly dispersing in an aqueous medium the whole amount of (A) a polyester resin comprising a polybasic acid and a polyhydric alcohol and having an acid value of 10 to 40 mg KOH/g, a weight average molecular weight of 9,000 or more, or a relative viscosity of 1.20 or higher and the whole or a part of (B) a basic compound, (C) an amphipathic organic solvent capable of plasticizing said polyester resin, in an amount of from 0.5 to 10% by weight based on said polyester resin aqueous dispersion, and (D) a compound having a protective colloid action, in an amount of from 0.01 to 3% by weight based on said polyester resin, heating the system at a temperature ranging from (i) the higher of (i-1) the glass transition temperature of said polyester resin and (i-2) 60° C. to (ii) 90° C. either after or while adding the rest of the components (B), (C) and (D) to the system while stirring, and continuing the stirring at the heating temperature for 15 to 120 minutes.

The present invention in a third aspect relates to a polyester resin aqueous dispersion comprising:

(A') a polyester resin comprising a polybasic acid and a polyhydric alcohol and having an acid value of 8 to 36 mg KOH/g, a number average molecular weight of 4,000 or more, and a polydispersity index on molecular weight distribution of not less than 4.0, (B) a basic compound, (C) an amphipathic organic solvent capable of plasticizing the polyester resin, in an amount of from 0.5 to 10% by weight based on said polyester resin aqueous dispersion, and (D') a compound having a protective colloid action, in an amount of 0.05% by weight or less based on said polyester resin, wherein fine particles of said polyester resin are homogeneously dispersed in an aqueous medium.

The present invention in a fourth aspect relates to a method for producing a polyester resin aqueous dispersion comprising the steps of:

roughly dispersing in an aqueous medium the whole amount of (A') a polyester resin comprising a polybasic acid and a polyhydric alcohol and having an acid value of 8 to 36 mg KOH/g, a number average molecular weight of 4,000 or more, and a polydispersity index on molecular weight distribution of not less than 4.0 and the whole or a part of (B) a basic compound, (C) an amphipathic organic solvent capable of plasticizing the polyester resin, in an amount of from 0.5 to 10% by weight based on said polyester resin aqueous dispersion, and (D') a compound having a protective colloid action, in an amount of 0.05% by weight or less based on said polyester resin, heating the system at a temperature ranging from (i) the higher of (i-1) the glass transition temperature of said polyester resin and (i-2) 60° C. to (ii) 90° C. either after or while adding the rest of the components (B), (C) and (D') to the system while stirring, and continuing the stirring at the heating temperature for 15 to 120 minutes.

BRIEF DESCRIPTION OF THE DRAWINGS

FIGS. 1A to 3G each show typical particle size distribution models of polyester resin particles in an aqueous medium.

DETAILED DESCRIPTION OF THE INVENTION

The present invention will be described in detail below.

The term "polyester resin aqueous dispersion" as used herein means such composition that fine particles of the polyester resin are homogeneously dispersed in an aqueous medium, which can also be referred to as "a water-born polyester resin dispersion" or "a polyester emulsion".

Polyester Resin:

In the present invention the following polyester resin (A) or polyester resin (A') is used.

Polyester resin (A) has an acid value of 10 to 40 mg KOH/g, preferably 10 to 35 mg KOH/g. If the acid value exceeds 40 mg KOH/g, the coating film formed from the polyester resin aqueous dispersion may have poor water resistance. If the acid value is less than 10 mg KOH/g, the amount of carboxyl groups which contribute to the formation of the fine resin particles will be insufficient for obtaining a satisfactory aqueous dispersion. Polyester resin (A) should have a weight average molecular weight of 9,000 or higher as measured by gel permeation chromatography (GPC; calibrated with polystyrene) or a relative viscosity of 1.20 or more as measured in a 1:1 (by weight) mixture of phenol and 1,1,2,2-tetrachloroethane at a concentration of 1% by weight at 20° C. If the weight average molecular weight is less than 9,000 and the relative viscosity is less than 1.20, the resulting polyester resin aqueous dispersion fails to form a coating film having sufficient processability. Polyester resin (A) preferably has a weight average molecular weight of 12,000 or higher, particularly 15,000 or higher. A preferred upper limit is 45,000. A polyester resin having a weight average molecular weight exceeding 45,000 tends to deteriorate the operating properties in the preparation of the polyester resin, and an aqueous dispersion of such a polyester resin tends to have an abnormally high viscosity. The relative viscosity is preferably 1.22 or higher, still preferably 1.24 or higher. A preferred upper limit is 1.95. If the relative viscosity exceeds 1.95, the operating properties in the resin preparation may be deteriorated, and an aqueous dispersion of such a polyester resin tends to have an abnormally high viscosity.

Polyester resin (A') has an acid value of 8 to 36 mg KOH/g, preferably 8 to 33 mg KOH/g, still preferably 10 to 28 mg KOH/g. If the acid value exceeds 36 mg KOH/g, the coating film formed from the resin aqueous dispersion may have poor water resistance. If the acid value is less than 8 mg KOH/g, the amount of carboxyl groups which contribute to the formation of the fine resin particles will be insufficient for obtaining a satisfactory aqueous dispersion.

Polyester resin (A') should have a number average molecular weight of 4,000 or higher as measured by GPC. If the number average molecular weight is less than 4,000, the coating film formed from the resin aqueous dispersion does not exhibit sufficient processability, chemical resistance and water resistance. A preferred number average molecular weight of polyester (A') is 4,500 or higher, particularly 5,000 or higher. A preferred upper limit is 15,000. A polyester resin whose number average molecular weight exceeds 15,000 can hardly have a sufficient acid value or, if provided with a sufficient acid value, the aqueous dispersion tends to have an abnormally high viscosity.

In order for the coating film to exhibit excellent water resistance, it is particularly important for polyester resin (A') to have such molecular weight distribution that polydispersity index is 4.0 or more which is the ratio of the weight average molecular weight (Mw) to the number average molecular weight (Mn), i.e., Mw/Mn, where both Mw and Mn are measured by GPC. If the above-identified polydispersity index is less than 4.0, the polyester resin, especially one having a small acid value, cannot be smoothly dispersed as fine particles in an aqueous medium. Even though an aqueous dispersion may be obtained, a compound having a protective colloid action must be added in an increased amount in order to achieve satisfactory storage stability. A preferred polydispersity index as to the molecular weight distribution of the polyester resin (A') is 4.3 or higher, particularly 4.5 or higher. A preferred upper limit is 15. This type of polyester resin having a polydispersity index exceeding 15 is very difficult to produce, requiring strict condition controls, and can hardly satisfy the above-mentioned condition as to the number average molecular weight.

Polyester resins (A) and (A') are synthesized substantially from polybasic acids and polyhydric alcohols and are essentially water-insoluble. That is, the resin cannot be dispersed or dissolved in water by itself. The term "substantially" as used herein means that preferably 80 mol % or more, more preferably 90 mol % or more, most preferably 95 mol % or more of the monomers constituting the polyester are polybasic acids and polyhydric alcohols. The components constituting the polyester resins of the present invention are described below.

Of the polybasic acids for use in the present invention, aromatic dicarboxylic acids include terephthalic acid, isophthalic acid, orthophthalic acid, naphtalenedicarboxylic acid and biphenyldicarboxylic acid. If desired, 5-hydroxyisophthalic acid may be used in combination in a small proportion as to not deteriorate the water resistance. Aliphatic dicarboxylic acids include saturated dicarboxylic acids, such as oxalic acid, succinic acid or an anhydride thereof, adipic acid, azelaic acid, sebacic acid, dodecanedicarboxylic acid and a hydrogenated dimeric acid; and unsaturated dicarboxylic acids, such as fumaric acid, maleic acid or an anhydride thereof, itaconic acid or an anhydride thereof, citraconic acid or an anhydride thereof and a dimeric acid. Alicyclic dicarboxylic acids include 1,4-cyclohexanedicarboxylic acid, 1,3-cyclohexanedicarboxylic acid, 1,2-cyclohexanedicarboxylic acid, 2,5-norbornenedicarboxylic acid or an anhydride thereof, and tetrahydrophthalic acid or an anhydride thereof.

The amount of aromatic polybasic acids as a proportion of the total acid components is preferably 50 mol % or more. If the proportion is less than 50 mol %, that is, if the structures derived from aliphatic and/or alicyclic polybasic acids occupy the major part of the resin skeleton, the coating film formed of the resulting aqueous dispersion tends to suffer from a reduction in hardness, stain resistance or water resistance. Furthermore, since the aliphatic and/or alicyclic ester bonds are less resistant against hydrolysis than aromatic ester bonds, the above aqueous dispersion tends to have reduced storage stability. In order to secure satisfactory storage stability, the amount of aromatic polybasic acids as a proportion of the total acid components is preferably 70 mol % or higher. For achieving the objects of the invention, terephthalic acid particularly preferably constitutes 65 mol % or more of the total acid components in view of improvements in processability, water resistance, chemical resistance and weather resistance of the coating film in balance with other performance properties of the coating film.

The polyhydric alcohol components for use in the present invention include glycols such as aliphatic glycols having 2 to 10 carbon atoms, alicyclic glycols having 6 to 12 carbon atoms and ether bond-containing glycols. The aliphatic glycols having 2 to 10 carbon atoms include ethylene glycol, 1,2-propylene glycol, 1,3-propanediol, 1,4-butanediol, 2-methyl-1,3-propanediol, 1,5-pentanediol, neopentyl glycol, 1,6-hexanediol, 3-methyl-1,5-pentanediol, 1,9-nonanediol and 2-ethyl-2-butylpropanediol. The alicyclic glycols having 6 to 12 carbon atoms include 1,4-cyclohexanedimethanol. The ether bond-containing glycols include diethylene glycol, triethylene glycol, dipropylene glycol, and bisphenols, each of whose two phenolic hydroxyl groups are added with one to several molecules of ethylene oxide or propylene oxide (e.g., 2,2-bis(4-hydroxyethoxyphenyl)propane). Polyethylene glycol, polypropylene glycol or polytetramethylene glycol may be used if desired. It should be noted, however, that the amount of the ether bond-containing glycol is preferably up to 10% by weight, still preferably up to 5% by weight, at most based on the total polyhydric alcohol components. This is because an ether structure reduces the water resistance and weather resistance of the polyester resin coating film.

In the practice of the present invention, ethylene glycol and/or neopentyl glycol preferably constitute 50 mol % or more, particularly 65 mol % or more, of the total polyhydric alcohol components. Both ethylene glycol and neopentyl glycol are mass-produced on an industrial scale and are therefore inexpensive and provide the coating film with well-balanced performance properties. In particular, ethylene glycol is effective in improving chemical resistance, while neopentyl glycol is effective in improving weather resistance.

If desired, the polyester resin for use in the present invention may contain a co-polymerized tri- or higher-functional polybasic acid and/or a tri- or higher-functional polyhydric alcohol. Useful tri- or higher-functional polybasic acids include trimellitic acid or an anhydride thereof, pyromellitic acid or an anhydride thereof, benzophenonetetracarboxylic acid or an anhydride thereof, trimesic acid, ethylene glycol bis(anhydrotrimellitate), glycerol tris (anhydrotrimellitate) and 1,2,3,4- butanetetracarboxylic acid. Useful tri- or higher-functional polyhydric alcohols include glycerol, trimethylolethane, trimethylolpropane and pentaerythritol. These tri- or higher-functional polybasic acids and/or polyhydric alcohols can be copolymerized in a proportion of not more than 10 mol %, preferably not more than 5 mol %, based on the total acid components or total alcohol components. If the proportion exceeds 10 mol %, the excellent processability of the coating film, which is an advantageous characteristic of a polyester resin, cannot be maintained.

If desired, the polyester resin may further comprise other comonomer components, such as fatty acids (e.g., lauric acid, myristic acid, palmitic acid, stearic acid, oleic acid, linoleic acid, and linolenic acid) or derivatives thereof capable of forming an ester bond, non-volatile monocarboxylic acids (e.g., benzoic acid, p-tert-butylbenzoic acid, cyclohexanoic acid, and 4-hydroxyphenylstearic acid), non-volatile monohydric alcohols (e.g., stearyl alcohol and 2-phenoxyethanol), and hydroxycarboxylic acids (e.g., $\epsilon$-caprolactone, lactic acid, $\beta$-hydroxybutyric acid and p-hydroxybenzoic acid) or derivatives thereof capable of forming an ester bond.

The polyester resin for use in the present invention is synthesized from the aforesaid monomers by known processes, for example, (a) a process comprising reacting the entire monomer components and/or an oligomer thereof at 180° to 250° C. in an inert atmosphere for 2.5 to 10 hours to effect esterification, and then conducting polycondensation at a temperature of 220° to 280° C. under a reduced pressure of 1 Torr or lower until the desired molecular weight is reached, (b) a process in which the above-described polycondensation reaction is ended before the desired molecular weight is reached, and the reaction product is mixed with a chain extender selected from polyfunctional epoxy compounds, isocyanate compounds, oxazoline compounds, etc. and allowed to react for a short time to increase the molecular weight, or (c) a process in which the above-described polycondensation reaction is allowed to proceed until the molecular weight exceeds a desired level, and monomer components are further added to the reaction system to conduct depolymerization in an inert atmosphere under atmospheric pressure or under increased pressure, to thereby obtain a polyester resin having the desired molecular weight.

From the standpoint of water resistance of the coating film, the carboxyl groups necessary for the formation of the fine polyester resin particles in an aqueous medium are preferably localized at the terminals of the resin molecular chain rather than in the resin skeleton. Introduction of a specific amount of carboxyl groups into the molecular chain terminals of a high molecular weight polyester resin is preferably carried out as follows.

In the production of polyester resin (A), where the above-described process (a) is followed, a tri- or higher-functional polybasic acid component is added to the reaction system after commencement of the polycondensation reaction, or a polybasic acid anhydride is immediately added before completing the polycondensation reaction. Where process (b) is followed, a low molecular weight polyester resin in which most of its molecular chains are terminated with a carboxyl group is used to react with a chain extender. Where process (c) is followed, a di- or higher-functional polybasic acid component is used as a depolymerizing agent.

In the production of polyester resin (A'), the following methods are preferable. Where process (b) is followed, a low molecular weight polyester resin in which most of its molecular chains are terminated with a carboxyl group is used to react with a chain extender. Where process (c) is followed, a di- or higher-functional polybasic acid component is used as a depolymerizing agent. In the case of polyester resin (A'), the reaction at a high temperature of 200° C. or above is always accompanied by ester-interchange reaction as a competing reaction. It follows that the molecular weight distribution of the resulting resin becomes narrow with the passage of time. Therefore, in any of the above processes, the treatment in the final stage should be completed before the system reaches equilibrium.

While the polyester resin content in the polyester resin aqueous dispersion of the present invention is appropriately selected depending on its final use, the dry thickness of the coating film and the method of molding, it preferably ranges, in general, from 0.5 to 50% by weight, particularly 1 to 40% by weight. As described below, the polyester resin aqueous dispersion of the present invention provides excellent storage stability even at a solids concentration as high as 20% by weight or more. Nevertheless, if the polyester resin content exceeds 50% by weight, the dispersion has a considerably high viscosity and tends to be practically difficult to mold.

Basic Compounds:

When the polyester resin is dispersed in an aqueous medium, it is neutralized with a basic compound. In the present invention, the neutralization reaction of the carboxyl groups in the polyester resin with the basic compound is a driving force of self-emulsification. The electrical repulsion among the resultant carboxyl anions, in cooperation with a very small amount of a compound having a protective colloid action described below, prevents the dispersed fine particles from flocculation. The basic compound for use in the present invention is preferably capable of volatilizing at the time of film formation or bake-curing with a curing agent. Such basic compounds include ammonia and organic amine compounds having a boiling point of 250° C. or lower. Examples of suitable organic amine compounds are triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine and N-ethylmorpholine.

The basic compound is preferably added in an amount sufficient to neutralize at least part of the carboxyl groups present in the polyester resin, which depends on the carboxyl group content, i.e., an amount of from 0.2 to 1.5 equivalents, particularly 0.4 to 1.3 equivalent, to the carboxyl groups. In amounts less than 0.2 equivalent/—COOH, the effect of adding the basic compound is not substantially produced. In amounts exceeding 1.5 equivalents/—COOH, the polyester resin aqueous dispersion tends to have a considerably high viscosity.

Amphipathic Organic Solvent:

For the purpose of accelerating the self-emulsification of the polyester resin, an amphipathic organic solvent is used which is capable of plasticizing the polyester resin. Commonly used compounds generally called organic solvents which have a boiling point of not higher than 250° C. and have low toxicity, low explosiveness and low flammability are used. Compounds whose boiling point exceeds 250° C. are too slow to evaporate and cannot be removed completely when the coating film is dried.

The organic solvent for use in the invention is an amphipathic solvent which is capable of plasticizing the polyester resin. The term "amphipathic" as used herein means that the organic solvent preferably has a water solubility of at least 5 g/l, desirably 10 g/l or higher, at 20° C. An organic solvent having a solubility of less than 5 g/l has little effect in accelerating the self-emulsification. The capability of the organic solvent in plasticizing the polyester resin can be ascertained through the following simple test. A square specimen having a dimension of 3×cm×3cm×0.5 cm (thickness) is cut out of a polyester resin sample and then immersed in 50 ml of an organic solvent at 25° to 30° C. for 3 hours. The organic solvent is considered to be capable of plasticizing the polyester resin if the specimen after the immersion is visibly deformed or if a stainless steel rod of 0.2 cm in diameter, when brought into contact with the specimen under a static load of 1 $kg/cm^2$ applied in the thickness direction, penetrates the specimen to a depth of 0.3 cm or more. An organic solvent that is incapable of plasticizing the polyester resin produces little effect of accelerating the self-emulsification.

The organic solvents satisfying the above criteria include alcohols, such as ethanol, n-propanol, isopropyl alcohol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-propanol, n-hexanol and cyclohexanol; ketones, such as methyl ethyl ketone, methyl isobutyl ketone, ethyl butyl ketone, cyclohexanone and isophorone; ethers, such as tetrahydrofuran and dioxane; esters, such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate; glycol derivatives, such as ethylene glycol, ethylene glycol monomethyl ether, ethylene glycol monoethyl ether, ethylene glycol monobutyl ether, ethylene glycol ethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether and propylene glycol methyl ether acetate; 3-methoxy-3-methylbutanol, 3-methoxybutanol, acetonitrile, dimethylformamide, dimethylacetamide, diacetone alcohol and ethyl acetoacetate. These solvents may be used either individually or as a mixture of two or more thereof.

Of the above-exemplified organic solvents, those satisfying the following two conditions, used either alone or as a combination of two or more thereof, are preferred not only for their particularly excellent effect of accelerating the self-emulsification but also for the excellent storage stability of the polyester resin aqueous dispersion thus prepared.

Condition 1: The amphipathic organic solvent has a hydrophobic structure having directly bonded 4 or more carbon atoms in a molecule thereof.

Condition 2: The amphipathic organic solvent, at the molecular terminal thereof, has a substituent containing at least one atom having a Pauling's electronegativity of 3.0 or more, and exhibits a polarity such that the carbon atom directly bonded to the atom having an electronegativity of 3.0 or more shows a chemical shift of 50 ppm or more in the $^{13}$C-NMR spectrum as measured in $CDCl_3$ at room temperature.

The hydrophobic structure having directly bonded 4 or more carbon atoms means a saturated or unsaturated straight or branched hydrocarbon structure having 4 or more carbon atoms, such as n-butyl, isobutyl, sec-butyl, tert-butyl, n-amyl, :isoamyl, sec-amyl, tert-amyl, and the like.

The substituent specified by condition 2 includes an alcoholic hydroxyl group, a methyl ether group, a ketone group, an acetyl group, a methyl ester group and so on. Particularly preferable organic solvents among the compounds satisfying the above-mentioned two conditions include alcohols, such as n-butanol, isobutanol, sec-butanol, tert-butanol, n-amyl alcohol, isoamyl alcohol, sec-amyl alcohol, tert-amyl alcohol, n-hexanol and cyclohexanol; ketones, such as methyl isobutyl ketone and cyclohexanone; esters, such as n-butyl acetate, isobutyl acetate, sec-butyl acetate and 3-methoxybutyl acetate; glycol derivatives, such as ethylene glycol monobutyl ether, diethylene glycol monobutyl ether and propylene glycol monobutyl ether; 3-methoxy-3-methylbutanol, and 3-methoxybutanol.

These organic solvents can be removed from the system at least partly by stripping in the step of emulsifying or the subsequent step, as long as the organic solvent has a boiling point of not higher than 100° C. or is capable of forming an azeotropic mixture with water. The final content of the organic solvent in the polyester resin aqueous dispersion should be 0.5 to 10% by weight, preferably 0.5 to 5% by weight based on the polyester resin aqueous dispersion. As long as the organic solvent content falls within the range of from 0.5 to 10% by weight, the polyester resin aqueous dispersion exhibits excellent storage stability and excellent film-forming properties. If the organic solvent content is less than 0.5% by weight, a long time may be disadvantageously required for the formation of the polyester fine particles or polyester resin fine particles having a desired particle distribution are not formed. If the organic solvent content is higher than 10% by weight, on the other hand, the essential object of the water-born system cannot be achieved and, in addition, the aqueous dispersion may disadvantageously have an abnormally increased viscosity or poor storage stability or poor film-forming properties.

Compounds Having a Protective Colloid Action:

A compound having a protective colloid action is used if needed for securing the stability of the aqueous dispersion during the step of removing the organic solvent from the system (stripping) or during storage. The term "protective colloid action" as used herein means the action of being adsorbed onto the surface of the resin fine particles in an aqueous medium to exert a stabilizing effect, a so-called "mixing effect", "osmotic effect" and "volume restriction effect", to thereby prevent flocculation of the fine particles. Compounds having such a protective colloid action include polyvinyl alcohol, carboxymethyl cellulose, hydroxyethyl cellulose, hydroxypropyl cellulose, modified starch, polyvinylpyrrolidone, polyacrylic acid, a vinyl polymer having acrylic acid and/or methacrylic acid as one component, polyitaconic acid, gelatin, gum arabic, casein and swelling mica. These compounds are water-soluble or can be made water-soluble by partially neutralizing with a basic compound. The basic compound should be ammonia and/or the above-described organic amine compounds so as not to impair the water resistance of the coating film formed from the aqueous dispersion. Furthermore, the compound having a protective colloid action preferably has a number average molecular weight of 1,500 or more, particularly 2,000 or more, especially 2,500 or more, so that the compound exerts its action as a protective colloid when used in a small amount without impairing the water resistance, chemical resistance and other properties of the coating film formed.

The compound having a protective colloid action is used in an amount of 0.01 to 3% by weight, preferably 0.03 to 2% by weight, based on polyester resin (A). As long as the amount of the compound having a protective colloid action falls within this range, the stability of the polyester resin aqueous dispersion in the step of emulsifying or during storage of the dispersion can be markedly improved without deteriorating various performance properties of the coating film of the dispersion. Furthermore, the use of this compound leads to a reduction in acid value of the polyester resin and a reduction in the amount of the organic solvent.

The compound having a protective colloid action is used in an amount of not more than 0.05% by weight, preferably not more than 0.03% by weight, based on polyester (A'). As long as the amount of the compound is 0.05% or less, the stability of the polyester resin aqueous dispersion in the step of emulsifying or during storage of the dispersion can be markedly improved without deteriorating various performance properties of the coating film of the dispersion.

Preparation of Polyester Resin Aqueous Dispersion:

The polyester resin aqueous dispersion of the present invention is prepared by a method practically comprising four steps of roughly dispersing, heating, emulsifying and cooling. In the step of roughly dispersing, the whole amount of polyester resin (A) and the whole or part of other components (B), (C), and (D), or the whole amount of polyester resin (A') and the whole or part of other components (B), (C), and (D'), are roughly dispersed in an aqueous medium. In the step of heating, the system is heated at a temperature ranging from (i) the higher of (i–1) the glass transition temperature of the polyester resin and (i–2) 60° C. to (ii) 90° C. either after or while adding the rest of the remaining components to the system while stirring. In the step of emulsifying, the stirring is continued at that temperature for 15 to 120 minutes to form fine particles of the polyester resin. In the step of cooling, the resulting polyester resin aqueous dispersion is cooled preferably to room temperature.

Each of these steps is essential to the method of the present invention, and is preferably carried out continuously. One of the characteristics of the method of the present invention is that special equipment is not needed to carry out these steps.

The treating apparatus for carrying out these steps must be capable of appropriately stirring the polyester resin powder or granules together with an aqueous medium and other components, and heating the system in the apparatus to a temperature of from 60° to 90° C. Apparatus widely known in the art as a solid/liquid mixer or an emulsifier can be used. This type of apparatus includes single-axis stirrers, such as a propeller mixer and a turbine mixer; turbine-stator type high-speed rotating stirrers (e.g., T.K. Homo-Mixer and T.K. Homo-Jettor both manufactured by Tokushu Kika Kogyo K.K., Ultra-Turrax manufactured by IKA-MASCHINENBAU); and combined stirrers (e.g., a combination of a high-speed shearing mixer and a low-speed sliding type kneading paddle equipped with a wall scraper or an anchor agitator, such as T.K. Agi-Homo-Mixer and T.K. Combimix, both manufactured by Tokushu Kika Kogyo K.K.). The treating apparatus may be a batch type or a continuous type in which the feed materials and treated product are introduced and withdrawn continuously, respectively. While a closed treating apparatus is preferred, there is no problem in working with an open type apparatus when the boiling point of the organic solvent used is 100° C. or higher.

Step of Roughly Dispersing:

All of the raw materials may be introduced into the treating apparatus at once, or a part of the raw materials is first placed in the treating apparatus and the rest is placed into the treating apparatus at a certain stage, or the raw materials may be added in divided portions or continuously. Part of the raw material may be placed into the treating apparatus during or after the step of roughly dispersing. Any of these addition techniques can be adopted basically, but as far as the polyester resin is concerned, it should be placed in the apparatus during the step of roughly dispersing for the following reason. If the polyester resin, which is fed in the form of a powder, granules, or pellet, is heated nearly to its glass transition temperature in a non-stirred state or at an insufficient stirring speed, the powder, granules, or pellets combine into lumps which are not emulsified to form the fine resin particles even if the system is stirred at a higher speed. The other materials can be placed in the apparatus at any stage from the step of roughly dispersing through the step of emulsifying, provided that the compound having a protective colloid action is dissolved or homogeneously dispersed in the aqueous medium before starting the treatment for emulsifying, taking into consideration the object of adding the compound. Where the compound having a protective colloid action is sparingly soluble in the aqueous medium, it is preferably added before the step of roughly dispersing or the compound is added in the form of a previously prepared aqueous solution in the aqueous medium.

The polyester resin that is subjected to the step of roughly dispersing can be in the form of powder or granules. Even pellets obtained from the polymerization system may be sufficiently emulsified in a short period of time, as long as each side of the pellet is not longer than 0.8 cm. As a matter of course, as the size of the polyester resin that is to be emulsified becomes finer, the frequency of contact between the polyester resin and the aqueous medium, namely, the basic compound increases. This makes it possible to further shorten the time required for the treatment. However, the present invention is characterized in that the polyester resin can be sufficiently emulsified by using a short treatment time even in the industrial scale without dividing the particles finer than necessary by mechanical grinding or the like. Taking into account the energy or time required for obtaining fine particles of the resin by mechanical grinding, etc., the polyester resin is preferably subjected to emulsification when the pellets have a size, taken as a cube, having a side length of 0.1 to 0.5 cm, particularly 0.15 to 0.3 cm.

The step of roughly dispersing, which is carried out to prevent the polyester resin from aggregation into the above-mentioned lumps, is usually carried out by stirring at room temperature. when the subsequent step of heating takes time, the step of roughly dispersing may be effected while heating.

In this case, it is necessary to homogeneously disperse the powdered or granular polyester resin in the aqueous medium until the time when the inner temperature reaches 40° C. The term "aqueous medium" as used herein means water or a mixture of water and one or more of the aforesaid organic solvent, basic compound and compound having a protective colloid action. When the system reaches a state of "complete suspension" as defined by T. N. Zwietering (*Chemical Engineering Science*, Vol. 8, p. 244 (1958)), that is, a state in which none of the particles remains on the bottom of the container more than 1 second, the step of roughly dispersing is considered to have reached its end point. This is the state in which the polyester resin powder, granules or pellets are homogenously dispersed in the aqueous medium. The system in the apparatus is preferably stirred at a speed not lower than the "minimum stirring speed for complete suspension state $N_{JS}$" for achieving a "complete suspension state". The state of stirring in the apparatus is easily judged with the naked eye. Because the stirring speed for complete suspension depends on the type, size or position (in the apparatus) of the stirring blade, the amount or shape of the polyester resin placed into the apparatus, and many other factors, the stirring speed is selected by conducting a preliminary test in a practically used treating apparatus. As the stirring speed increases in excess of $N_{JS}$, gas entrapment from the free surface begins at and above a certain speed $N_{SA}$. While this phenomenon may be eliminated or subdued by use of a commercially available defoaming and antifoaming agent, the stirring speed is preferably in the range of from $N_{JS}$ to $N_{SA}$.

As soon as the system in the apparatus reaches the above-mentioned complete suspension state, the heating step which is the next step should be taken while maintaining that state. If the system is heated before the "complete suspension state" is reached, the resin particles may aggregate into lumps as stated above.

Step of Heating:

In the heating step the system in the apparatus is heated to a temperature required for emulsifying the polyester resin. As long as the organic solvent and the basic compound are present in the apparatus, self-emulsification starts in the heating step. However, because the rate of this self-emulsification is not sufficient, the system is preferably heated to a prescribed temperature in as short a time as possible. Heating means include a jacket provided around the apparatus, a spiral heating coil inserted in the apparatus, and a combination thereof. While any of these heating means can be used in the present invention, the manner of heating is desirably such that a prescribed temperature is reached in a minimum time period, and the inner temperature is made uniform throughout the system and is controlled to high precision.

A case may occur in which self-emulsification proceeds excessively in the heating step, resulting in an abnormal increase in viscosity of the aqueous medium. Such being the case, the problem could be solved by pouring either the organic solvent or the basic compound into the apparatus in the subsequent step of emulsifying.

Step of Emulsifying:

In the present invention, the time when the inner temperature reaches the higher of (i) the glass transition temperature of the resin and (ii) 60° C. is taken as the point at which the system is transferred to the step of emulsifying. The above temperature condition should be regarded as essential and important for obtaining an aqueous dispersion of the present invention. This can be understood from not only the fact that self-emulsification, which proceeds even at a low temperature, shows progress at an amazing speed upon heating at or above the above-specified temperature, but also because self-emulsification in a low temperature is accompanied with an abnormal increase in viscosity as stated above. This makes stirring virtually impossible, and fails to obtain a desired aqueous dispersion. Also, this problem never arises where self-emulsification is allowed to proceed at or above the above-specified temperature. Note that the inner temperature is preferably kept at or below 90° C. If the inner temperature exceeds 90° C., a considerable amount of water evaporates. This sometimes accelerates flocculation of the polyester resin fine particles thus produced.

In this step, the viscosity of the aqueous medium somewhat rises so that entrapment of gas from the free surface begins at a stirring speed $N'_{SA}$ that is higher than $N_{SA}$. Accordingly, the stirring is preferably conducted at a speed ranging from $N_{JS}$ to $N'_{SA}$. At a stirring speed lower than $N_{JS}$, the renewal of surface of the polyester resin powder, granules, or pellets is insufficient such that a longer time would be needed for completing self-emulsification. If the stirring speed exceeds $N'_{SA}$, on the other hand, foaming (gas entrapment) will occur. This not only deteriorates the workability, but also reduces the total of contact area of the polyester resin powder, granules or pellets with the aqueous medium, and extends the time needed for completing self-emulsification.

The end point of this step can easily be judged from whether or not coarse particles remain by observing with the naked eye or by touch. More accurately, it is decided by measuring the particle size distribution of the polyester resin fine particles thus produced. The subsequent cooling step may be carried out after a target particle size distribution is reached, or, if desired, the system may be subjected to stripping to remove the organic solvent from the system.

The step of emulsifying can usually be accomplished by continued stirring for 15 to 120 minutes under the above-described conditions. If this time is less than 15 minutes, a considerable amount of coarse particles of the polyester resin remain in the system. If the time is more than 120 minutes, the polyester resin undesirably tends to hydrolyze.

Step of Cooling:

In the cooling step, the resulting aqueous dispersion is cooled generally to 5° C. to 35° C., preferably to room temperature (e.g., 20° C. to 30° C.). The cooling may be spontaneous cooling or forced cooling by circulating a coolant through the above-mentioned jacket or coil. During the cooling, the dispersion is preferably stirred until it is cooled to 40° C. or below in order to prevent so-called skinning (a phenomenon in which only the water on the surface of the aqueous dispersion evaporates to form a film having a high solids concentration), and also because the storage stability of the aqueous dispersion is poorer at a higher temperature. Since the stirring in the cooling step is only for the above-described purposes, it is preferably conducted at a speed of not higher than $N_{JS}$. During the step of cooling, other substances described below may be added or mixed into the system.

Particle Size of Polyester Resin Particles:

The polyester resin fine particles dispersed in the aqueous medium thus prepared by the above-stated method preferably satisfy one or more of the following conditions (1) to (3):

(1) The median size of the particle size distribution on the basis of volume is not greater than 2 μm, and the maximum particle size does not exceed 10 μm.

(2) The dispersed polyester resin fine particles have a particle size distribution such that the mode size, on the basis of volume, of the hump on the finest particle side of the particle size distribution is not greater than 1 μm, and the 80% diameter does not exceed 4 μm.

(3) The median size of the particle size distribution on the basis of volume is not greater than 2 μm, the mode size, on the basis of volume, of the hump on the finest particle side of the particle size distribution is not greater than 1 μm, and the particle size distribution also satisfies the following relationship (1):

$$\log(90\% \text{ diameter}/10\% \text{ diameter}) \leq 1 \tag{1}$$

Namely, the present inventors found that the excellent storage stability of the aqueous dispersion is manifest when at least one of conditions (1), (2) and (3) above concerning the dispersed particle size distribution is satisfied.

More specifically, if the dispersed polyester particles have a particle size distribution such that the median size exceeds 2 μm or the maximum size exceeds 10 μm, the aqueous dispersion may suffer from a considerable increase in viscosity or phase separation during storage. The median size is preferably 0.3 to 2 μm, still preferably 0.3 to 1.8 μm. The maximum size is preferably not greater than 8 μm, still preferably not greater than 7 μm. Dispersed polyester particles whose median size is less than 0.3 μm are susceptible to hydrolysis.

If the dispersed polyester particles have a particle size distribution such that the mode size of the hump on the finest particle side exceeds 1 μm or the 80% diameter exceeds 4 μm, the aqueous dispersion may suffer from a considerable increase in viscosity or phase separation during storage. The mode size is preferably 0.05 to 1 μm, still preferably 0.08 to 1 μm. The 80% diameter of the polyester resin particles is preferably not greater than 3.8 μm, still preferably not greater than 3.5 μm. Dispersed polyester particles whose mode size of the hump on the finest particle side is less than 0.05 μm are susceptible to hydrolysis. The terminology "80% diameter" as used herein denotes the particle diameter at the point of 80% of the cumulative particle size distribution curve on a volumetric basis.

If the dispersed polyester particles have a particle size distribution such that the median size exceeds 2 μm, or the mode size of the hump on the finest particle side exceeds 1 μm, or the spread of the distribution is so broad that relationship (1) is not satisfied, the aqueous dispersion may suffer from a considerable increase in viscosity or phase separation during storage. The median size is preferably 0.3 to 2 μm, still preferably 0.3 to 1.8 μm. The mode size of the hump on the finest particle side is preferably 0.05 to 1 μm, still preferably 0.08 to 1 μm. Dispersed polyester particles whose median size is less than 0.3 μm or whose mode size of the hump on the finest particle side is less than 0.05 μm are susceptible to hydrolysis. The spread of distribution represented by the relationship (1) is preferably not more than. 0.98, more preferably not more than 0.96. The terminology "90% (or 10%) diameter" as used in relationship (1) denotes the particle diameter at the point of 90% (or 10%) of the cumulative particle size distribution curve on a volumetric basis.

These particle size distributions are measurements made on the polyester resin aqueous dispersion prepared without any dilution. That is, this information includes the state of flocculation of the polyester resin particles dispersed in the aqueous medium.

The particle size distribution of the polyester resin particles dispersed in the aqueous medium can be measured with a laser diffraction particle size analyzer, for example, a SALD-2000 High Concentration Measuring System manufactured by Shimadzu Corp.

In order to exhibit excellent storage stability, the particle size distribution of the polyester resin particles in the aqueous medium preferably satisfies at least one of the above-prescribed conditions. FIGS. 1A to 3G show typical models of the particle size distribution of the polyester resin particles in the aqueous medium.

In FIGS. 1A through 1G, curves 1A and 1B satisfy condition (1). That is, the median size on a volumetric basis is not greater than 2 μm, and the maximum size does not exceed 10 μm. To the contrary, curves 1C to 1G are generally unsatisfactory. Curve 1C shows large size secondary particles produced as a result of flocculation of primary particles. Curves 1D and 1G show a large proportion of secondary particles. Curves 1E and 1G indicate that the polyester resin particles are coarse, and curve 1F shows a broad particle size distribution. In these cases, the polyester resin aqueous dispersions generally have unsatisfactory storage stability.

In FIGS. 2A through 2G, curves 2A and 2B satisfy condition (2). That is, in the particle size distribution on the basis of volume, the hump on the finest particle side has a mode size of not greater than 1 μm, and the 80% diameter does not exceed 4 μm. To the contrary, curve 2C shows a large size of secondary particles produced as a result of flocculation of primary particles. Curves 2D and 2G show a large proportion of secondary particles. Curves 2E and 2G indicate that the polyester resin particles are coarse as a whole, and curve 2F shows a broad particle size distribution. In these cases, the polyester resin aqueous dispersions generally have unsatisfactory storage stability.

In FIGS. 3A through 3G, curves 3A and 3B satisfy condition (3). That is, the median size of the particle size distribution on the basis of volume is not greater than 2 μm, the mode size of the hump on the finest particle side is not greater than 1 μm, and relationship (1) is fulfilled. To the contrary, curve 3C shows a large size of secondary particles produced as a result of flocculation of primary particles. Curves 3D and 3G show a large proportion of secondary particles. Curves 3E and 3G indicate that the polyester resin particles are coarse as a whole, and curve 3F shows a broad particle size distribution. In these cases, the polyester resin aqueous dispersions are generally unsatisfactory in storage stability.

It is seen from FIGS. 1A to 3G that the storage stability of a polyester resin aqueous dispersion is greatly influenced not only by the particle size distribution of the primary resin particles, which has been recognized as being significant, but also by the state of flocculation of the primary particles and the amount of the flocculated particles (i.e. the secondary particles) in the aqueous medium. Accordingly, it is important to control the state of flocculation so as to improve the storage stability of the aqueous dispersion.

While the phenomenon occurring during the above-described step of emulsifying has not been completely elucidated, the above-described organic solvent apparently acts as a plasticizer of the polyester resin. In fact, when the system is heated to 60° C. or higher while stirring in the absence of the above-described basic compound, resin softening is observed. The time needed for emulsification can be markedly reduced by using an organic solvent satisfying the above-described two conditions. This is attributable to the effect of rendering the surface of the polyester resin powder, granules, or pellets hydrophilic, as well as the plasticizing effect of the organic solvent. It seems that the organic solvent, containing both a hydrophobic structure and a highly polar structure in a molecule thereof, serves to increase the frequency of contact between the carboxyl groups in the hydrophobic polyester resin and the hydrophilic and highly polar basic compound. It is further understood that the storage stability of the aqueous dispersion is remarkably improved because such organic solvent can act as a dispersion stabilizer due to its structure like a surfactant (i.e. containing both of a hydrophilic group and a hydrophobic group).

In the embodiment using polyester resin (A'), polyester resin (A') is a high molecular weight polyester resin having a lower acid value than polyester resin (A), and yet can still be emulsified. In addition, while the amount of the compound having a protective colloid action is reduced, the aqueous dispersion still exhibits excellent storage stability. These advantages could be accounted for as follows. With the carboxyl group of a polyester resin present at the terminals of the molecular chain, if the polydispersity index on molecular weight distribution (Mw/Mn) of such a polyester resin is increased, there would be a low molecular weight fraction whose acid value is substantially higher than that of the whole resin and a high molecular weight fraction whose acid value is substantially lower than that of the whole resin. The former is more hydrophilic because of its higher acid value and has higher flowability because of its susceptibility to the plasticizing action by heating or by the organic solvent. As a result, the low molecular weight fraction is considered to be localized on the surface portion of the resin particles thus produced. In this case, the carboxyl group concentration on the surface portion of the resin particles would be higher than expected so that the electric repulsion among the carboxyl anions might be exerted more effectively.

If the polydispersity index on molecular weight distribution (Mw/Mn) is increased, the proportion of the low molecular weight fraction may increase. It follows that various properties of the coating film formed of the resulting resin aqueous dispersion are reduced. The inventors have actually encountered this problem in the course of their studies toward the present invention. As a result of further investigation, they found that various properties of the coating film are noticeably improved when the number average molecular weight of the polyester resin exceeds 4,000. Therefore, the polyester resin (A') has a number average molecular weight of 4,000 or higher.

The present invention is clearly distinguished from conventional techniques in that: a polyester resin can be formulated into an aqueous dispersion having a high solids concentration, to thereby satisfy the recent movements toward environmental and resource conservation, hazardous substance regulations and improvement of the working environment; the aqueous dispersion of the invention exhibits excellent storage stability (poor storage stability of this type of aqueous dispersion has frequently presented a problem in the prior art) and also forms a coating film having excellent performance properties inherent to the polyester resin; and the present invention provides methods for producing such a polyester resin aqueous dispersion, which can easily be carried out by one skilled in the art without the need for special equipment or complicated operations.

The polyester resin aqueous dispersion of the present invention can be used as paints, adhesives, inks, fiber treating agents, paper coatings and other various coating compositions. While the polyester resin aqueous dispersion can be used as such, excellent performance as a coating film will be exhibited by adding a curing agent into the dispersion and curing the coating film by baking. Useful curing agents include phenolic resins, aminoplast resins, polyfunctional epoxy compounds, polyfunctional isocyanate compounds and blocked isocyanate compounds thereof, and polyfunctional aziridine compounds. If desired, a reaction catalyst and an accelerator may be used in combination. Pigments, dyes and various additives can be incorporated into the polyester resin aqueous dispersion of the invention. The polyester resin aqueous dispersion can also be used as a mixture with other water-borne resins.

The paints, adhesives, inks, fiber-treating agents, paper coatings and other various coatings using the polyester resin aqueous dispersion of the present invention can be made into a homogenous and high gloss coating film by dip coating, brush coating, roll coating, spray coating, gravure coating or other various printing techniques.

The present invention will now be illustrated in greater detail with reference to the following Examples, but it should be understood that the invention is not to be construed as being limited thereto. Unless otherwise indicated, all the parts and percents are by weight. Measurements of physical and performance properties were made according to the following methods.

(1) Polyester Resin Composition:

Measured by $^1$H-NMR (300 MHz, manufactured by Varian). For resins containing a monomer component showing no assignable or measurable peak on the $^1$H-NMR spectrum thereof, the resin was decomposed with methanol in a closed tube at 230° C. for 3 hours and then subjected to gas chromatography for quantitative analysis.

(2) Weight Average Molecular Weight (Mw), Number Average Molecular Weight (Mn), and Relative Viscosity of Polyester Resin:

As described above, the weight average molecular weight (Mw) and number average molecular weight (Mn) of the polyester resin were obtained by GPC analysis (GP chromatograph: manufactured by Shimadzu Corp.; solvent: tetrahydrofuran; UV-visible spectrophotometer; detection wavelength: 254 nm; calibrated with polystyrene). The relative viscosity was measured with a Ubbellohde viscometer in a 1:1 (by weight) mixture of phenol and 1,1,2,2-tetrachloroethane at a concentration of 1 wt % at 20° C.

(3) Acid Value of Polyester Resin:

One gram of a polyester resin was dissolved in 30 ml of chloroform or dimethylformamide (DMF) and titrated with KOH using phenolphthalein as an indicator. The number of milligrams of KOH consumed for neutralization was given as the acid value.

(4) Glass Transition Temperature (Tg) of Polyester Resin:

Tg was measured using a sample weighing 10 mg by means of a differential scanning calorimeter (DSC 7, manufactured by Perkin-Elmer Co.) at a rate of temperature rise of 10° C./min.

(5) Solids Content of Aqueous Dispersion:

An adequate amount of an aqueous dispersion under evaluation was weighed and heated at or above the boiling point of the organic solvent contained in the aqueous dispersion until the weight of the residue (i.e., solid matter) became constant. The solids content or solid concentration was calculated based on these measurements.

(6) Particle Size Distribution of Aqueous Dispersion:

An aqueous dispersion, without being diluted, was disposed in a uniform thin layer between a pair of glass slides. The particle size distribution was measured with a laser diffraction particle size analyzer (SALD-2000 High Concentration Measuring System manufactured by Shimadzu Corp.) at 20° C. In the calculation of a particle size distribution from the resulting light intensity curve, a refractive index 1.6–0.1i providing the most appropriate result from the light intensity curve was adopted. The results were not subjected to any further processing, such as approximation to a distribution function or smoothing. The upper limit value of the maximum particle size fraction of each particle size distribution was taken as a representative value of the maximum (particle) size. The center value of the fraction having the maximum of the distribution at the finest particle side, i.e., the fraction having the maximum of the distribution assigned to the primary particles, was taken as a mode size of the hump on the finest particle side.

(7) Viscosity of Aqueous Dispersion:

The viscosity of the aqueous dispersion was measured with a corn-plate type rotational viscometer (MR-3 Soliquid Meter, manufactured by Rheology Ltd.) at a shear rate of 10 sec$^{-1}$ at 30° C. Taking the thixotropic flow of the aqueous dispersion into consideration, the measurement was made after reaching a steady flow state.

(8) Adhesion to Film and Water Resistance:

The aqueous dispersion was spread on a polyethylene terephthalate (PET) film and dried to form a coating layer. An 18 mm wide adhesive tape specified in JIS Z-1522 was placed onto the coating layer and rubbed with an eraser to completely adhere to the substrate film. The adhesive tape was rapidly stripped off of the PET film at a peel angle of 90° C. The adhesive side of the adhesive tape was subjected to surface infrared spectroscopic analysis using a SYSTEM 2000 manufactured by Perkin-Elmer Co. and a germanium prism (60°, 50×20×2 mm) to determine whether or not the coating layer formed of the aqueous dispersion was transferred to the adhesive tape (ordinary state adhesion).

Then, a PET film having formed thereon the coating layer of the aqueous dispersion was retort-treated at 115° C. for 20 minutes and dried in an oven at 50° C. for 10 minutes. The surface of the coating layer of the PET film was analyzed in the same manner as described above to determine whether or not the coating layer remained on the film surface.

The specimens still having the coating layer thereon were then subjected to the peel test using an adhesive tape in the same manner as described above. After the adhesive tape was stripped, both the adhesive side of the adhesive tape and the coated side of the PET film were subjected to surface analysis (adhesion after retort treatment)

(9) Surface Smoothness of Coating Film:

Observed with the naked eye.

(10) Gloss of Coating Film:

Reflectance at 60° was measured with a glossmeter (Gloss Checker IG-310, manufactured by Horiba Seisakusho).

(11) Processability of Coating Film:

An outer coated steel plate was bent under a pressure of 10 kg/cm$^2$ and n plates each having the same thickness as the plate to be bent were inserted into the inside of the bend portion. The crack of the coating film generated at the bend was observed under a 50× magnifier. The [nT] in Table 6 and Table 12 means the minimum number of plates at which a crack was not generated even when n plates each having the same thickness as the plate to be bent were inserted into the inside of the bend portion.

(12) Pencil Hardness of Coating Film:

The hardness of a coating film formed on a steel plate was measured using a high quality pencil as specified in JIS S-6006 in accordance with JIS K-5400.

(13) Solvent Resistance of Coating Film:

A coating film was rubbed with gauze impregnated with xylene, and the number of rubbings (double strokes) applied before appearance of the substrate was recorded.

(14) Hot Water Resistance of Coating Film:

A coated steel plate was treated in a hot water bath at a predetermined temperature for 1 hour, and a gloss retention (%) represented by the following formula was obtained.

Gloss Retention (%)=(Gloss after Treatment/Initial Gloss)×100

Preparation of Polyester Resins:

Polyester Resin A-1:

A mixture of 1,578 g of terephthalic acid, 83 g of isophthalic acid, 374 g of ethylene glycol and 730 g of neopentyl glycol was stirred in an autoclave at 260° C. for 2.5 hours to effect esterification. To the reaction system was added 0.262 g of germanium dioxide as a catalyst, the temperature of the system was elevated to 280° C. over a period of 30 minutes, and the system pressure was slowly reduced to 0.1 Torr over a 1 hour period. The system was maintained under these conditions for additional 1.5 hours to effect polycondensation. Then nitrogen gas was admitted into the autoclave to atmospheric pressure, and the temperature of the system was reduced. At 260° C., 50 g of isophthalic acid and 38 g of trimellitic anhydride were added thereto, followed by stirring at 255° C. for 30 minutes. The reaction mixture was withdrawn and cast into a sheeting. After the sheeting was sufficiently cooled to room temperature, it was crushed in a crusher and sieved to obtain a fraction of 1 to 6 mm mesh (designated polyester resin A-1). The results of analyses on polyester resin A-1 are shown in Table 1 below.

Polyester Resins A-2 to A-7 and A-9:

Polyester resins A-2 to A-7 and A-9 were prepared in the same manner as polyester resin A-1. The results of analyses on these resins are shown in Table 1.

Polyester Resin A-8:

A mixture of 1,973 g of terephthalic acid, 104 g of isophthalic acid, 430 g of ethylene glycol and 980 g of neopentyl glycol was stirred in an autoclave at 260° C. for 2.5 hours to effect esterification. To the reaction system was added 0.329 g of germanium dioxide, the temperature of the system was elevated to 280° C. over a period of 30 minutes, and the pressure of the system was slowly reduced to 0.1 Torr over a 1 hour period. The system was maintained under these conditions for additional 1.5 hours to effect polycondensation. Then nitrogen gas was admitted into the autoclave to atmospheric pressure, and the temperature of the system was reduced. At 250° C., 52 g of neopentyl glycol was added thereto, followed by stirring at 245° C. for 30 minutes. The temperature of the system was further reduced to 200° C., and 56 g of phthalic anhydride was added thereto. The mixture was then allowed to react for 10 minutes. The reaction mixture was worked up in the same manner as polyester resin A-1 to obtain polyester resin A-8. The results of analyses on the resin are shown in Table 1.

Alkyd Resin A-10:

A mixture of 650 g of soybean fatty acids, 1,010 g of hexahydrophthalic anhydride, 955 g of adipic acid, 575 g of pentaerythritol, 2,020 g of diethylene glycol, 795 g of polyethylene glycol (PEG 6000S, produced by Sanyo Chemical Industries, Ltd.), 200 g of xylene for refluxing and 8.5 g of dibutyltin oxide as a catalyst was stirred in an autoclave at 200° to 210° C. until the acid value became 10 mg KOH/g. Thereafter, 215 g of trimellitic anhydride was added to the reaction mixture to react for 10 minutes in a nitrogen atmosphere to obtain alkyd resin A-10 having a granular shape similar to polyester resin A-1. As a result of analyses, alkyd resin A-10 had an acid value of 20.5 mg KOH/g, a Mw of 9,400 and a relative viscosity of 1.30. Although a clear Tg was not observed, the resin softened on heating to 60° C.

EXAMPLE 1

In a 2 l-volume jacketed glass container were placed 200 g of polyester resin A-1, 35 g of ethylene glycol n-butyl ether, 459 g of a 0.5 wt % aqueous solution of polyvinyl alcohol (Unitika Poval 050G, produced by Unitika Ltd.) (the polyvinyl alcohol solution will hereinafter be referred to as PVA-1) and N,N-dimethylethanolamine (hereinafter abbreviated as DMEA) in an amount corresponding to 1.2 times the total carboxyl group content present in polyester resin A-1. Upon stirring the mixture in an open container by means of a bench homodisperser (Homodisper T.K. ROBO MICS, manufactured by Tokushu Kika Kogyo K.K.) at 6,000 rpm, the mixture was confirmed to be in a "complete suspension state" with no sediment of the resin powder and granules on the bottom of the container. After this state was maintained for 10 minutes, hot water was circulated through the jacket. When the inner temperature reached 68° C., the stirring speed was increased to 7,000 rpm. The stirring was continued for an additional 20 minutes while keeping the inner temperature at 68° to 70° C., to thereby obtain a homogenous milky white aqueous dispersion. Cool water was then circulated through the jacket, and the system was cooled to room temperature while stirring at 3,500 rpm. When the system was filtered through a stainless steel filter (635 mesh, plain weave), almost no resin particle remained on the filter. The results of analyses on the filtrate (designated aqueous dispersion B-1) are shown in Table 2 below.

EXAMPLES 2 TO 6

Aqueous dispersions were prepared from various raw materials in the same manner as in Example 1. The results of analyses on the resulting aqueous dispersions are shown in Table 2.

COMPARATIVE EXAMPLES 1 TO 5

Aqueous dispersions were prepared from various raw materials in the same manner as in Example 1. The results of analyses on the resulting aqueous dispersions are shown in Table 3.

COMPARATIVE EXAMPLE 6

An attempt to dissolve 200 g of polyester resin A-1 in 800 g of tetrahydrofuran by refluxing failed. A similar attempt using methyl ethyl ketone also failed. Then, stirring the resin in a mixed solvent of 200 g of tetrahydrofuran and 100 g of cyclohexanone at 64° to 65° C. gave a uniform solution. The resulting solution was kept at 60° C., and a mixture of DMEA in the same amount as used in Example 1 and 600 g of PVA-1 was added thereto dropwise at a rate of 10 g/min while stirring at 6,000 rpm by means of a bench homodisperser (T.K. ROBO MICS) in an attempt to induce phase inversion. However, the viscosity of the system remarkably increased in the course of addition of the mixture which made stirring practically impossible.

COMPARATIVE EXAMPLE 7

Two hundred grams of polyester resin A-2 were stirred in a mixed solvent of 200 g of tetrahydrofuran and 100 g of ethylene glycol n-butyl ether at 64° to 65° C. to prepare a uniform solution. The solution was added dropwise to a mixture of DMEA in an amount corresponding to 1.2 times the total carboxyl group content of the polyester resin and 600 g of PVA-1 at a rate of 30 g/min while stirring at 7,000 rpm by means of a bench homodisperser (T.K. ROBO MICS). After the addition, the stirring was continued at room temperature for 30 minutes to prepare a homogenous aqueous dispersion. The aqueous dispersion was stirred at 7,000 rpm in a hot water bath at 80° C. in an attempt to remove the tetrahydrofuran. However, flocculation occurred before the tetrahydrofuran odor dissipated to thereby form white lumps. Replacement of PVA-1 with a 4 wt % aqueous solution of the same polyvinyl alcohol (hereinafter referred to as PVA-3) produced the same result.

EXAMPLE 7 AND COMPARATIVE EXAMPLE 8

The same system as in Example 1, except that monoethanolamine (hereinafter abbreviated as MEA) was used in place of DMEA was stirred at room temperature at 6,000 rpm for 10 minutes. When the stirring speed was then increased to 7,000 rpm, the inner temperature gradually rose. When the temperature reached 42° C., the viscosity of the system considerably increased which made further stirring practically impossible (Comparative Example 8).

Separately, the steps of roughly dispersing and heating were carried out under the same conditions as in Example 1, except that MEA was used in place of DMEA and ethylene glycol n-butyl ether was not used from the beginning but added to the system dropwise at a rate of 7 g/min when the inner temperature reached 68° C. After the addition, the system was further stirred at 68° to 70° C. for 25 minutes, cooled and filtered to obtain an aqueous dispersion designated aqueous dispersion B-12 (Example 7). The results of analyses on aqueous dispersion B-12 are shown in Table 2.

EXAMPLE 8 AND COMPARATIVE EXAMPLE 9

In a 2 l-volume jacketed glass container were placed 200 g of polyester resin A-4, 45 g of ethylene glycol n-butyl ether, 470 g of PVA-1 and DMEA in an amount corresponding to 1.3 times the total carboxyl group content present in the polyester resin. After the system was stirred at 6,000 rpm for 10 minutes by means of a bench homodisperser (T.K ROBO MICS), hot water was circulated through the jacket to heat the system. When the inner temperature reached 52° C., the stirring speed was increased to 7,000 rpm, and the stirring was continued while keeping the inner temperature at 52 to 55° C. Sixty minutes later, coarse particles were still observed with the naked eye and by touch (Comparative Example 9).

On the other hand, when the same procedure was repeated except that the step for emulsifying was effected at 63° to 66° C. for 28 minutes, a homogeneous milky white aqueous dispersion was obtained, designated aqueous dispersion B-13 (Example 8). The results of analyses on aqueous dispersion B-13 are shown in Table 2.

COMPARATIVE EXAMPLE 10

The same raw materials as used in Example 1 were placed in a 2 l-volume jacketed glass container and stirred at 3,000 rpm with a bench homodisperser (T.K. ROBO MICS). During the stirring, a sediment of the resin powder and granules was always observed on the bottom of the container. Then, the system was heated in the same manner as in Example 1. When the inner temperature reached 60° C., the sediment on the bottom of the container softened into uniform clear lumps. The stirring was continued for an additional 30 minutes at a stirring rate which was increased to 7,000 rpm and at an inner temperature which was raised to 70° to 73° C., but the lumps did not disappear.

COMPARATIVE EXAMPLE 11

Polyester resin A-8 was subjected to the same treatment as in Example 1. Even though the time of stirring at 68° to 70° C. was extended to 40 minutes, the presence of coarse particles was observed with the naked eye.

COMPARATIVE EXAMPLES 12 AND 13

The procedures of Example 1 were repeated, except that ethylene glycol n-butyl ether was replaced with 50 g of methanol, which is amphipathic but incapable of plasticizing polyester resin A-1. The treatment of the step for emulsifying was carried out for 20 minutes, but almost no change took place in the system. That is, there was no change in the appearance of the resin particles (Comparative Example 12).

On the other hand, when 50 g of xylene, which is capable of plasticizing polyester resin A-1 but is not amphipathic, was used as an organic solvent, the presence of coarse particles was still observed with the naked eye even after the treatment for the emulsifying step was carried out for 40 minutes (Comparative Example 13).

EXAMPLE 9

The procedures of Comparative Example 2 were repeated, except for using ethylene glycol n-butyl ether. A homogeneous milky white aqueous dispersion was obtained. The results of analyses on the aqueous dispersion (designated aqueous dispersion B-14) are shown in Table 2.

EXAMPLE 10 AND COMPARATIVE EXAMPLES 14 AND 15

Preparation of Aqueous Dispersion B-15:

An aqueous dispersion was prepared in the same manner as in Example 1, except for using polyester resin A-6. The results of analyses on the resulting aqueous dispersion (aqueous dispersion B-15) are shown in Table 4.

Adhesion to Film and Water Resistance:

Aqueous dispersion B-1, B-9 and B-15 were applied to a commercially available biaxially stretched PET film (thickness: 15 $\mu$m) to a dry thickness of 3 $\mu$m by means of a bar coater (Film Applicator No. 542-AB, manufactured by Yasuda Seiki K.K.) and dried at 60° C. for 5 minutes and then at 150° C. for 2 minutes. The adhesion of the coating layer to the PET film (ordinary state adhesion) and the water resistance of the coating layer (adhesion after retort treatment) were evaluated according to the test methods described above. The results obtained are shown in Table 5.

EXAMPLE 11

A mixture of aqueous dispersion B-1 (its solid content: 80 parts), 20 parts of a melamine resin (CYMEL 325, produced by Mitsui-Cyanamid Ltd.), 100 parts of titanium dioxide (Tipaque CR-50, produced by Ishihara Sangyo Kaisha, Ltd.) and 250 parts of glass beads was shaken in a paint shaker for 1 hour. The resulting white enamel was applied to a Bonderite test plate (a product of Nippon Test Panel Osaka K.K.; 0.8×70×150 mm), preliminarily dried at 70° C. for 1 minute, and baked at 150° C. for 20 minutes to form a cured coating film having a thickness of about 25 $\mu$m. The properties of the cured film are shown in Table 6 below. The coated plate was treated in a hot water bath at 60° C. to evaluate the hot water resistance of the cured film shown as in the Table.

EXAMPLE 12 AND COMPARATIVE EXAMPLE 16

The procedures of Example 1 were repeated except for using polyester resin A-7 to obtain an aqueous dispersion B-16. The results of analyses on aqueous dispersion B-16 are shown in Table 4.

White enamels and cured films were obtained in the same manner as in Example 11, except for replacing aqueous dispersion B-1 with other aqueous dispersions, respectively. The properties of the cured films are shown in Table 6.

EXAMPLES 13 AND 14 AND COMPARATIVE EXAMPLE 17

The procedures of Example 1 was repeated except for using polyester resins A-5, A-9 or alkyd resin A-10 to obtain aqueous dispersions B-17, B-18 and B-19, respectively. The results of analyses on the resulting aqueous dispersions are shown in Table 7 below.

White enamels and cured coating films were obtained in the same manner as in Example 11, except for replacing aqueous dispersion B-1 with each of the resulting aqueous dispersions, respectively. The properties of the cured films are shown in Table 6.

The abbreviations used in the following Tables have the following meanings unless otherwise indicated.

TPA Terephthalic acid
IPA Isophthalic acid
TMA(A) Trimellitic acid (anhydride)
PA(A) Phthalic acid (anhydride)
ADA Adipic acid
EG Ethylene glycol
NPG Neopentyl glycol
BAEO 2,2-Bis (4-hydroxyethoxyphenyl)propane
DMEA N,N-Dimethylethanolamine
MEA Monoethanolamine
TEA Triethylamine
BU-EG Ethylene glycol mono-n-butyl ether
Bu-Pg Propylene glycol mono-n-butyl ether
CyH Cyclohexanone
Et-EG Ethylene glycol monoethyl ether
HEC A 0.5 wt % aqueous solution of hydroxyethyl cellulose (HEC Daicel SP600 a product of Daicel Chemical Industries, Ltd.)
PIA A 0.5 wt % aqueous solution of polyitaconic acid (PIA-728, a product of Iwata Chemical Ltd.)
PVA-1 A 0.5 wt % aqueous solution of Poval 050G produced by Unitika Ltd.
PVA-2 A 0.5 wt % aqueous solution of Poval 180G produced by Unitika Ltd.
PVA-3 A 4 wt % aqueous solution of Poval 050G produced by Unitika Ltd.

TABLE 1

| | Polyester Resin | | | | | | | | |
|---|---|---|---|---|---|---|---|---|---|
| | A-1 | A-2 | A-3 | A-4 | A-5 | A-6 | A-7 | A-8 | A-9 |
| Depolymerizing Agent (mol %*) | IPA(3) TMAA(2) | IPA(1) TMAA(2) | TMA(2) TMAA(2) | IPA(1) PAA(1.5) | IPA(2) TMAA(2) | TMA(2.5) TMAA(3) | IPA(6) — | NPG(4) — | IPA(1) TMAA(2) |
| Polyester Resin Composition: | | | | | | | | | |
| Acid Component (mol): | | | | | | | | | |
| TPA | 95.1 | 67.8 | 85.0 | 70.1 | 50.3 | 94.8 | 90 | 91.4 | 45.0 |
| IPA | 8.0 | 32.9 | 14.8 | 15.9 | 52.0 | 5.0 | 15.8 | 4.8 | 1.0 |
| TMA | 2.0 | 2.1 | 3.9 | — | 1.9 | 5.6 | — | — | 1.9 |
| PA | — | — | — | 1.5 | — | — | — | 2.9 | — |
| ADA | — | — | — | 14.8 | — | — | — | — | 55.0 |
| Total | 105.1 | 102.7 | 103.7 | 102.3 | 104.2 | 105.4 | 105.9 | 99.1 | 102.9 |
| Alcohol Component (mol): | | | | | | | | | |
| EG | 44.3 | 39.8 | 58.8 | 44.4 | 44.1 | 39.9 | 39.8 | 38.6 | 30.3 |
| NPG | 55.7 | 60.2 | 31.3 | 55.7 | 55.9 | 60.2 | 60.1 | 61.4 | 69.7 |
| BAEO | — | — | 9.9 | — | — | — | — | — | — |
| Total | 100 | 100 | 100 | 100 | 100 | 100 | 100 | 100 | 100 |
| Acid Value (mgKOH/g) | 30.3 | 22.3 | 31.5 | 10.9 | 30.7 | 43.9 | 35.1 | 9.0 | 23.5 |
| Mw | 9800 | 13500 | 11500 | 19000 | 9900 | 10000 | 8500 | 11000 | 13600 |
| Relative Viscosity | 1.28 | 1.33 | 1.30 | 1.34 | 1.31 | 1.27 | 1.19 | 1.29 | 1.34 |
| Tg (°C.) | 68 | 63 | 70 | 50 | 66 | 66 | 67 | 65 | −20 |

Note:
*Mol % based on the total feed of acid components.

TABLE 2

| | Example 1 | Example 2 | Example 3 | Example 4 | Example 5 | Example 6 | Example 7 | Example 8 | Example 9 |
|---|---|---|---|---|---|---|---|---|---|
| Aqueous Dispersion Raw Materials: | B-1 | B-2 | B-3 | B-4 | B-5 | B-6 | B-12 | B-13 | B-14 |
| Polyester Resin (200 g) | A-1 | A-2 | A-1 | A-2 | A-3 | A-1 | A-1 | A-4 | A-1 |
| Amine (eq./—COOH): | | | | | | | | | |
| DMEA | 1.2 | — | 1.2 | — | 1.2 | 1.2 | — | 1.3 | 0.75 |

TABLE 2-continued

|  | Example 1 | Example 2 | Example 3 | Example 4 | Example 5 | Example 6 | Example 7 | Example 8 | Example 9 |
|---|---|---|---|---|---|---|---|---|---|
| MEA | — | — | — | — | — | — | 1.2 | — | — |
| TEA | — | 1.2 | — | 1.2 | — | — | — | — | — |
| Organic Solvent (g): | | | | | | | | | |
| Bu-EG | 35 | 37 | — | — | 35 | 27 | 35 | 45 | 38 |
| Bu-PG | — | — | 25 | — | — | — | — | — | — |
| CyH | — | — | — | 35 | — | — | — | — | — |
| Et-EG | — | — | — | — | — | — | — | — | — |
| Protective Colloid Aqueous Solution (g): | | | | | | | | | |
| PVA-1 | 459 | — | — | — | 460 | — | 459 | 470 | — |
| PVA-2 | — | 460 | — | — | — | — | — | — | 458 |
| PVA-3 | — | — | — | — | — | — | — | — | — |
| HEC | — | — | 460 | — | — | — | — | — | — |
| PIA | — | — | — | 460 | — | 330 | — | — | — |
| Step of Emulsifying: | | | | | | | | | |
| Inner Temp. (°C.) | 68–70 | 65–68 | 68–70 | 68–70 | 70–73 | 68–70 | 68–70 | 63–66 | 68–70 |
| Treating Time (min) | 20 | 20 | 20 | 20 | 20 | 20 | 30 | 28 | 10 |
| Characteristics of Aqueous Dispersion: | | | | | | | | | |
| Solids Conc. (%) | 29.9 | 30.3 | 29.9 | 30.5 | 30.5 | 37.0 | 30.0 | 28.6 | 29.3 |
| Particle Size Distribution: | | | | | | | | | |
| Number of Humps | 2 | 2 | 2 | 2 | 2 | 2 | 2 | 2 | 2 |
| Median Size ($\mu$m) | 1.09 | 1.79 | 1.97 | 1.02 | 1.17 | 1.35 | 1.03 | 1.11 | 1.80 |
| Maximum Size ($\mu$m) | 6.02 | 8.68 | 7.23 | 6.02 | 6.02 | 7.23 | 6.02 | 6.02 | 8.68 |
| Mode Size* ($\mu$m) | 0.62 | 0.74 | 0.74 | 0.43 | 0.43 | 0.36 | 0.62 | 0.43 | 0.62 |
| 80% Diameter ($\mu$m) | 2.75 | 3.16 | 2.99 | 2.28 | 2.38 | 2.34 | 2.13 | 2.23 | 4.16 |
| Spread** | 0.844 | 0.882 | 0.935 | 0.956 | 0.922 | 0.932 | 0.922 | 0.914 | 0.992 |
| Viscosity (poise) | 1 | 5 | 5 | <1 | 2 | 10 | 11 | 7 | 15 |
| Storage Stability: | | | | | | | | | |
| Room temp. × 60 Days: | | | | | | | | | |
| Change in Appearance | none | none | none | none | none | none | none | none | none |
| Viscosity (poise) | 2 | 5 | 3 | <1 | 3 | 20 | 30 | 4 | 20 |
| Room temp. × 120 Days: | | | | | | | | | |
| Change in Appearance | none | none | none | none | none | none | none | none | thickened |
| Viscosity (poise) | 2 | 10 | 5 | <1 | 3 | 15 | 35 | 1 | — |

Note:
*Mode size of the hump positioned on the finest particle side.
**log(90% Diameter/10% diameter)

TABLE 3

|  | Comparative Example No. | | | | |
|---|---|---|---|---|---|
|  | 1 | 2 | 3 | 4 | 5 |
| Aqueous Dispersion | B-7 | B-8 | B-9 | B-10 | B-11 |
| Raw Materials: | | | | | |
| Polyester Resin (200 g) | A-1 | A-1 | A-1 | A-4 | A-3 |
| Amine (eq./—COOH): | | | | | |
| DMEA | 1.1 | 0.75 | — | 0.5 | — |
| MEA | — | — | — | — | 1.8 |
| TEA | — | — | 1.8 | — | — |
| Organic Solvent (g): | | | | | |
| Bu-EG | 80 | — | 35 | — | 50 |
| Bu-PG | — | — | — | — | — |
| CyH | — | — | — | 39 | — |
| Et-EG | — | 38 | — | — | — |
| Protective Colloid Aqueous Solution (g): | | | | | |
| PVA-1 | 459 | — | — | 459 | 459 |
| PVA-2 | — | 458 | — | — | — |
| PVA-3 | — | — | 459 | — | — |
| HEC | — | — | — | — | — |
| PIA | — | — | — | — | — |
| Step of Emulsifying: | | | | | |
| Inner Temp. (°C.) | 68–70 | 68–70 | 70–73 | 70–72 | 70–72 |
| Treating Time (min) | 20 | 10 | 20 | 30 | 30 |
| Characteristics of Aqueous Dispersion: | | | | | |
| Solids Conc. (%) | 29.9 | 29.4 | 29.8 | 29.9 | 29.5 |

TABLE 3-continued

|  | Comparative Example No. | | | | |
| --- | --- | --- | --- | --- | --- |
|  | 1 | 2 | 3 | 4 | 5 |
| Particle Size Distribution: | | | | | |
| Number of Humps | 2 | 2 | 2 | 1 | 2 |
| Median Size (μm) | 2.68 | 1.44 | 2.59 | 1.87 | 1.97 |
| Maximum Size (μm) | 15.0 | 18.0 | 10.4 | 12.5 | 15.0 |
| Mode Size* (μm) | 0.62 | 0.89 | 0.62 | 1.84 | 0.43 |
| 80% Diameter (μm) | 4.46 | 4.57 | 5.06 | 3.13 | 4.99 |
| Spread** | 0.999 | 1.07 | 1.01 | 0.715 | 1.24 |
| Viscosity (poise) | 30 | 13 | 6 | 7 | 23 |
| Storage Stability: | | | | | |
| Room temp. × 60 Days: | | | | | |
| Change in Appearance | thickened | thickened | thickened | thickened | phase separated |
| Viscosity (poise) | — | — | — | — | — |
| Room temp. × 120 Days: | | | | | |
| Change in Appearance | — | — | — | — | — |
| Viscosity (poise) | — | — | — | — | — |

Note:
*Mode size of the hump positioned on the finest particle side.
**log(90% Diameter/10% diameter)

TABLE 4

|  | Aqueous Dispersion | |
| --- | --- | --- |
|  | B-15 | B-16 |
| Starting Polyester Resin Characteristics: | A-6 | A-7 |
| Particle Size Distribution: | | |
| Number of Humps | 2 | 2 |
| Median Size (μm) | 0.40 | 1.40 |
| Maximum Size (μm) | 5.02 | 6.02 |
| Mode Size* (μm) | 0.25 | 0.43 |
| 80% Diameter (μm) | 1.85 | 2.48 |
| log(90% Diameter/10% Diameter) | 0.793 | 0.923 |
| Viscosity (poise) | 25 | 13 |

Note:
*The mode size of the hump on the finest particle side.

TABLE 5

|  | Example 10 | Compara. Example 14 | Compara. Example 15 |
| --- | --- | --- | --- |
| Aqueous Dispersion | B-1 | B-9 | B-15 |
| Peaks in Surface IR Spectrum, assigned to Polyester Resin Aqueous Dispersion: | | | |
| Ordinary State Adhesion (analysis on adhesive tape) Coating Layer after Retort Treatment | no peak peak appeared | no peak no peak | no peak no peak |
| Adhesion after Retort Treatment (analysis on PET film) | peak appeared | — | — |

TABLE 6

|  | Example No. | | | | Comparative Example No. | |
| --- | --- | --- | --- | --- | --- | --- |
|  | 11 | 12 | 13 | 14 | 16 | 17 |
| Aqueous Dispersion | B-1 | B-2 | B-17 | B-18 | B-16 | B-19 |
| Smoothness | good | good | good | good | good | good |
| Gloss | 88 | 89 | 85 | 88 | 87 | 84 |
| Processability | 2T | 2T | 4T | 6T | >12T | >12T |
| Pencil Hardness | 4H | 4H | 3H | 2H | 2H | H |
| Solvent Resistance | >100 | >100 | 80–90 | 70–80 | 30–50 | <30 |
| Hot Water Resistance | 98% | 96% | 90% | 80% | 58% | 53% |

TABLE 7

|  | Aqueous Dispersion | | |
| --- | --- | --- | --- |
|  | B-17 | B-18 | B-19 |
| Polyester Resin Characteristics: | A-5 | A-9 | A-10 |
| Particle Size Distribution: | | | |
| Number of Humps | 2 | 2 | 2 |
| Median Size (μm) | 1.55 | 1.40 | 1.72 |
| Maximum Size (μm) | 7.23 | 6.02 | 8.68 |
| Mode Size* (μm) | 0.36 | 0.43 | 0.74 |
| 80% Diameter (μm) | 2.64 | 2.51 | 3.04 |
| Spread** | 0.951 | 0.938 | 0.884 |
| Viscosity (poise) | 8 | 16 | 30 |
| Storage Stability: | | | |
| Room Temp. × 60 Days: | | | |
| Change in Appearance | none | none | phase separation |
| Viscosity (poise) | 28 | 70 | — |
| Room Temp. × 120 Days. | | | |
| Change in Appearance | none | thickened | — |
| Viscosity (poise) | 150 | — | — |

Note:
*Mode size of the hump on the finest particle side.
**log(90% Diameter/10% diameter).

Preparation of Polyester Resin:
Polyester Resin A'-1:
A mixture of 15.78 kg of terephthalic acid, 0.83 kg of isophthalic acid, 3.74 kg of ethylene glycol and 7.30 kg of neopentyl glycol was stirred in an autoclave at 260° C. for 2.5 hours to effect esterification. To the reaction system was added 2.62 g of germanium dioxide as a catalyst, the temperature of the system was elevated to 280° C. over a period of 30 minutes, and the pressure of the system was slowly reduced to 0.1 Torr over a 1 hour period. The system was maintained under these conditions for additional 1.5 hours to effect polycondensation. Then nitrogen gas was admitted into the autoclave to atmospheric pressure, and the temperature of the system was reduced. At 270° C., 500 g of isophthalic acid and 380 g of trimellitic anhydride were added thereto, followed by stirring at 265° C. for 15 minutes. The reaction mixture was withdrawn and cast into a sheeting. After the sheeting was sufficiently cooled to room temperature, it was crushed in a crusher and sieved to obtain a fraction of 1 to 6 mm mesh (designated polyester resin A'-1). The results of analyses on polyester resin A'-1 are shown in Table 8 below.

Polyester Resins A'-2 to A'-5:

Polyester resins A'-2 to A'-5 were prepared in the same manner as polyester resin A'-1. The results of analyses on the resulting polyester resins are shown in Table 8.

Polyester Resin A'-6:

A mixture of 4.984 kg of terephthalic acid, 1.210 kg of ethylene glycol and 1.875 kg of neopentyl glycol was stirred in an autoclave at 260° C. for 2.5 hours to effect esterification. To the reaction system was added 0.838 g of germanium dioxide as a catalyst, the temperature of the system was elevated to 280° C. over a period of 30 minutes, and the pressure of the system was slowly reduced to 0.1 Torr over a 1 hour period. The system was maintained under these conditions for additional 1.5 hours to effect polycondensation. Then nitrogen gas was admitted into the autoclave to increase the inner pressure to at least atmospheric pressure. The reaction mixture was withdrawn in strands, cooled with water and cut into chips. The resin chips were sufficiently dried and dry blended with 18.2 g of trimellitic anhydride per kg of the resin chips. Then, the blend was kneaded in a vented twin-screw extruder (PCM-45, manufactured by Ikegai Corp.) at 270° C. and extruded into sheeting while keeping the vent hole under a reduced pressure of 50 Torr or lower to capture the sublimate and distillate. The sheeting was sufficiently cooled to room temperature, crushed in a crusher, and sieved to obtain a fraction of 1 to 6 mm mesh (designated polyester resin A'-6). The results of analyses on polyester resin A'-6 are shown in Table 8.

Polyester Resin A'-7:

A mixture of 2.373 kg of terephthalic acid, 390 g of ethylene glycol and 1.265 kg of neopentyl glycol was stirred in an autoclave at 260° C. for 2.5 hours to effect esterification. To the reaction system was added 0.405 g of germanium dioxide, the temperature of the system was elevated to 280° C. over a period of 30 minutes, and the pressure of the system was slowly reduced to 0.1 Torr over a 1 hour period. The system was maintained under these conditions for additional 1.5 hours to effect polycondensation. Then nitrogen gas was admitted into the autoclave to atmospheric pressure, and the inner temperature was reduced. When the inner temperature reached 250° C., 27.4 g of trimellitic anhydride was added thereto, followed by stirring at 245° C. for 10 minutes (first stage depolymerization). The temperature was further reduced to 210° C., and 45.2 g of 2,2-bis(4-hydroxyethoxyphenyl)propane was added thereto. Then, the mixture was allowed to react for 20 minutes (second stage depolymerization). The reaction mixture was worked up in the same manner as polyester resin A'-1 to obtain granular polyester resin A'-7. The results of analyses on the resin are shown in Table 8.

Polyester Resins A'-8 and A'-9:

Polyester resins A'-8 and A'-9 were prepared in the same manner as polyester resin A'-7, except for changing the kind and amount of the depolymerizing agents used in the first stage depolymerization (acid anhydride) and in the second stage depolymerization (polyhydric alcohol) as shown in Table 8. The results of analyses on the resulting resins are shown in Table 8.

Polyester Resins A'-10 and A'-11:

Polyester resins A'-10 and A'-11 were prepared in the same manner as polyester resin A'-1, except that the depolymerization at 265° C. was carried out for a period of 30 minutes (polyester resin A'-10) or 10 minutes (polyester resin A'-11). The results of analyses on the resulting resins are shown in Table 8.

Polyester Resin A'-12:

Polyester resins A'-12 was prepared in the same manner as polyester resin A'-2, except that the depolymerization at 265° C. was carried out for a period of 30 minutes. The results of analyses on the resulting resin are shown in Table 8.

Polyester Resin A'-13:

One kilogram of polyester resin A'-11 was dry blended with 18 g of an epoxy compound (Denacol EX-711, produced by Nagase Chemicals Ltd.) and 1 g of triphenylphosphine, and the blend was extruded at 200° C. into sheeting by means of the above-mentioned vented twin-screw extruder (under a reduced pressure of 30 Torr). The sheeting was sufficiently cooled to room temperature, crushed in a crusher, and sieved to obtain a fraction of 1 to 6 mm mesh (designated polyester resin A'-13). As a result of analyses, the resin had an acid value of 18.6 mg KOH/g, a Mn of 6,800, a polydispersity index of molecular weight distribution (Mw/Mn) of 7.4 and a Tg of 65° C.

EXAMPLE 15

A bench homodisperser (T.K. ROBO MICS, manufactured by Tokushu Kika Kogyo K.K.) was used which was equipped with a jacketed 2 l-volume glass container in such a manner that the container was closed during stirring. In the glass container were placed 300 g of polyester resin A'-l, 50 g of n-butanol, 150 g of a 0.1 wt % aqueous solution of polyvinyl alcohol (Unitika Poval 050G, produced by Unitika Ltd.) (the polyvinyl alcohol will hereinafter be referred to as PVA), 490 g of distilled water and N,N-dimethylethanolamine (DMEA) in an amount corresponding to 1.2 times the total carboxyl group content of the polyester resin. The system was stirred at room temperature at 6,000 rpm, and it was confirmed that there was no sediment of the resin particles on the bottom of the container. Ten minutes after the confirmation, the mixture was heated by circulating hot water through the jacket. When the inner temperature reached 68° C., the stirring speed was increased to 7,000 rpm, and the stirring was continued for 20 minutes while keeping the inner temperature at 70° to 72° C. to obtain a homogeneous milky white aqueous dispersion. The aqueous dispersion was cooled to room temperature while stirring by circulating cold water through the jacket, followed by filtering through a stainless steel filter (635 mesh, plain weave). Almost no resin particles remained on the filter. The results of analyses on the filtrate (aqueous dispersion B'-1) are shown in Table 9 below.

EXAMPLES 16 TO 27 AND COMPARATIVE EXAMPLES 18 AND 19

Aqueous dispersions were prepared in the same manner as in Example 15, except for altering the kinds and amounts of the polyester resin and the compound having a protective colloid action as shown in Table 9. The results of analyses on the resulting aqueous dispersions are shown in Table 9.

In Examples 15, 18, and 22, the amount of n-butanol added was reduced to 30 g, but no degradation in performance was observed with respect to the time required for emulsification and the characteristics of the resulting aqueous dispersions.

COMPARATIVE EXAMPLE 20

Polyester resin A'-9 was subjected to the same treatment as in Example 15. Even though the time of stirring at 70° to 72° C. was extended to 40 minutes, most of the resin particles remained in the system.

COMPARATIVE EXAMPLE 21

Polyester resin A'-10 was subjected to the same treatment as in Example 16. When the inner temperature reached 68°

C., lumps of the resin were formed in the system which made it difficult to continue stirring.

EXAMPLES 28 TO 32 AND COMPARATIVE EXAMPLES 22 TO 25

Preparation of Aqueous Dispersions B'-16 to B'-19:

Aqueous dispersions B'-16 to B'-19 were prepared in the same manner as in Example 15, except for changing the kinds and amounts of the polyester resin and the compound having a protective colloid action as shown in Table 10 below. The results of analyses on resulting aqueous dispersions B'-16 to B'-19 are shown in Table 10. Adhesion to Film and Water Resistance:

The aqueous dispersion shown in Table 11 was applied to a commercially available biaxially stretched PET film (thickness: 15 μm) to a dry thickness of 3 μm by means of a bar coater (Film Applicator No. 542-AB, manufactured by Yasuda Seiki K.K.). The coating was dried at 60° C. for 5 minutes and then at 150° C. for 2 minutes. The adhesion of the coating layer to the PET film (ordinary state adhesion) and the water resistance of the coating layer (adhesion after retort treatment) were evaluated according to the test methods described above. The results obtained are shown in Table 11.

EXAMPLE 33

To aqueous dispersion B'-4 (its solid content: 85 parts) was added 15 parts of a melamine resin (CYMEL 325, produced by Mitsui-Cyanamid Ltd.) with stirring, and the stirring was continued for 30 minutes at room temperature. The resulting dispersion was applied onto a commercially available tin-free steel plate (0.2 mm thick) and baked at 170° C. for 10 minutes to form a cured coating film having a thickness of about 15 μm. The properties of the cured film are shown in Table 12 below. The coated steel plate was treated in a hot water bath of 80° C. to evaluate the hot water resistance of the coating film as shown in the Table.

EXAMPLES 34 TO 37 AND COMPARATIVE EXAMPLES 26 TO 28

A coating composition and a cured coating film were obtained in the same manner as in Example 33, except for replacing aqueous dispersion B'-4 with each of the aqueous dispersions shown in Table 12. The properties of the cured film are shown in Table 12.

TABLE 8

|  | Polyester Resin | | | | | |
| --- | --- | --- | --- | --- | --- | --- |
|  | A'-1 | A'-2 | A'-3 | A'-4 | A'-5 | A'-6 |
| Depolymerizing Agent (mol %*) | IPA(3) TMAA(2) | IPA(1) TMAA(2) | IPA(1) TMAA(2) | IPA(1) TMAA(2) | TMA(2.5) TMAA(3) | TMAA(2) |
| Polyester Resin Composition: | | | | | | |
| Acid Component (mol): | | | | | | |
| TPA | 95.0 | 67.9 | 60.3 | 44.8 | 90.1 | 100.0 |
| IPA | 8.0 | 32.9 | 31.0 | 1.0 | 9.9 | — |
| TMA | 2.0 | 2.0 | 2.1 | 2.0 | 5.5 | 1.5 |
| PA | — | — | — | — | — | — |
| ADA | — | — | 9.9 | 55.2 | — | — |
| Total | 105.0 | 102.8 | 103.3 | 103.0 | 105.5 | 101.5 |
| Alcohol Component (mol): | | | | | | |
| EG | 45.2 | 39.7 | 78.8 | 79.1 | 39.8 | 55.8 |
| NPG | 54.8 | 60.3 | 21.1 | 20.9 | 60.2 | 44.2 |
| BAEO | — | — | — | — | — | — |
| Total | 100 | 100 | 100 | 100 | 100 | 100 |
| Acid Value (mgKOH/g) | 31.0 | 21.8 | 24.0 | 22.3 | 40.0 | 13.6 |
| Mn | 4,000 | 5,300 | 5,500 | 5,700 | 4,100 | 10,100 |
| Polydispersity Index (Mw/Mn) | 4.5 | 4.8 | 4.8 | 4.7 | 4.3 | 4.0 |
| Tg (°C.) | 68 | 63 | 48 | −5 | 67 | 67 |
|  | Polyester Resin | | | | | |
|  | A'-7 | A'-8 | A'-9 | A'-10 | A'-11 | A'-12 |
| Depolymerizing Agent (mol %*) | TMAA(1) BAEO(1) | PAA(1.8) TMAA(0.2) BAEO(2.9) | PAA(2) BAEO(2.9) | IPA(3) TMAA(2) | IPA(3) TMAA(2) | IPA(1) TMAA(2) |
| Polyester Resin Composition: | | | | | | |
| Acid Component (mol): | | | | | | |
| TPA | 99.0 | 68.3 | 68.2 | 95.1 | 95.0 | 68.0 |
| IPA | — | 28.9 | 29.0 | 8.0 | 8.0 | 33.1 |
| TMA | 0.9 | 0.2 | — | 2.0 | 2.0 | 2.0 |
| PA | — | 1.7 | 2.0 | — | — | — |
| ADA | — | — | — | — | — | — |
| Total | 99.9 | 99.1 | 99.2 | 105.1 | 105.0 | 103.0 |

TABLE 8-continued

| Alcohol Component (mol): | | | | | | |
|---|---|---|---|---|---|---|
| EG | 30.8 | 38.7 | 37.8 | 44.8 | 45.1 | 40.1 |
| NPG | 68.2 | 58.5 | 59.4 | 55.2 | 54.9 | 60.0 |
| BAEO | 1.0 | 2.8 | 2.8 | — | — | — |
| Total | 100 | 100 | 100 | 100 | 100 | 100 |
| Acid Value (mgKOH/g) | 18.7 | 8.3 | 7.5 | 30.2 | 36.7 | 22.4 |
| Mn | 5,600 | 4,200 | 4,100 | 4,300 | 3,600 | 5,600 |
| Polydispersity Index (Mw/Mn) | 5.0 | 6.2 | 6.3 | 2.3 | 5.1 | 2.4 |
| Tg (°C.) | 65 | 61 | 62 | 68 | 68 | 64 |

Note:
*Mol % based on the total feed of acid components.

TABLE 9

| | Example No. | | | | | | | |
|---|---|---|---|---|---|---|---|---|
| | 15 | 16 | 17 | 18 | 19 | 20 | 21 | 22 |
| Aqueous Dispersion | B'-1 | B'-2 | B'-3 | B'-4 | B'-5 | B'-6 | B'-7 | B'-8 |
| Raw Materials: | | | | | | | | |
| Polyester Resin | A'-1 | A'-1 | A'-2 | A'-2 | A'-3 | A'-4 | A'-6 | A'-7 |
| Compound Having Protective Colloid Action (wt %[1]): | | | | | | | | |
| PVA | 0.050 | — | 0.015 | — | 0.020 | 0.020 | — | — |
| HEC[a] | — | — | — | 0.003 | — | — | — | — |
| PIA[b] | — | — | — | — | — | — | 0.050 | — |
| Characteristics of Aqueous Dispersion: | | | | | | | | |
| Solids Conc. (%) | 30.2 | 30.3 | 36.8 | 30.3 | 30.3 | 30.3 | 28.0 | 30.2 |
| Particle Size Distribution: | | | | | | | | |
| Number of Humps | 2 | 1 | 2 | 2 | 2 | 2 | 2 | 2 |
| Median Size ($\mu$m) | 0.78 | 0.82 | 1.13 | 0.83 | 0.77 | 0.78 | 0.96 | 0.96 |
| Maximum Size ($\mu$m) | 7.23 | 4.18 | 8.68 | 7.23 | 7.23 | 8.68 | 8.68 | 8.68 |
| Mode Size[c] ($\mu$m) | 0.74 | 0.52 | 0.74 | 0.74 | 0.74 | 0.74 | 0.89 | 0.89 |
| 80% Diameter ($\mu$m) | 1.85 | 1.24 | 2.72 | 2.02 | 1.63 | 1.51 | 1.90 | 2.04 |
| Spread[d] | 0.778 | 0.531 | 0.938 | 0.796 | 0.771 | 0.927 | 0.753 | 0.761 |
| Viscosity (poise) | 2 | 1 | 1 | 3 | 5 | 6 | 5 | 2 |
| Storage Stability: | | | | | | | | |
| Room temp. × 60 Days: | | | | | | | | |
| Change in Appearance | none | none | none | none | none | none | none | none |
| Viscosity (poise) | 3 | 2 | 2 | 3 | 5 | 10 | 5 | 3 |
| Room temp. × 120 Days: | | | | | | | | |
| Change in Appearance | none | none | none | none | none | thickened | none | none |
| Viscosity (poise) | 4 | 1 | 2 | 1 | 10 | — | 5 | 4 |

| | Example No. | | | | | Compara. Example | |
|---|---|---|---|---|---|---|---|
| | 23 | 24 | 25 | 26 | 27 | 18 | 19 |
| Aqueous Dispersion | B'-9 | B'-10 | B'-11 | B'-12 | B'-13 | B'-14 | B'-15 |
| Raw Materials: | A'-7 | A'-8 | A'-8 | A'-13 | A'-13 | A'-10 | A'-12 |
| Compound Having Protective Colloid Action (wt %[1]): | | | | | | | |
| PVA | 0.020 | — | 0.050 | 0.035 | — | 0.005 | — |
| HEC[a] | — | 0.020 | — | — | 0.015 | — | 0.005 |
| PIA[b] | — | — | — | — | 0.020 | — | — |

TABLE 9-continued

| Characteristics of Aqueous Disperision: | | | | | | | |
|---|---|---|---|---|---|---|---|
| Solids Conc. (%) | 30.3 | 30.4 | 35.1 | 30.3 | 30.3 | 30.3 | 30.3 |
| Particle Size Distribution: | | | | | | | |
| Number of Humps | 2 | 2 | 2 | 2 | 2 | 2 | 2 |
| Median Size ($\mu$m) | 0.89 | 1.14 | 1.06 | 0.78 | 1.84 | 1.01 | 1.03 |
| Maximum Size ($\mu$m) | 8.68 | 8.68 | 8.68 | 8.68 | 8.68 | 8.68 | 8.68 |
| Mode Size[c] ($\mu$m) | 0.89 | 0.74 | 0.25 | 0.74 | 0.89 | 0.89 | 0.89 |
| 80% Diameter ($\mu$m) | 1.22 | 2.48 | 1.95 | 1.49 | 4.11 | 2.56 | 2.56 |
| Spread[d] | 0.501 | 0.920 | 1.19 | 0.924 | 0.964 | 0.786 | 0.785 |
| Viscosity (poise) | 3 | 10 | 33 | 2 | 2 | 1 | 1 |
| Storage Stability: | | | | | | | |
| Room temp. × 60 Days: | | | | | | | |
| Change in Appearance | none | none | none | none | none | phase separation | phase separation |
| Viscosity (poise) | 4 | 11 | 39 | 4 | 4 | — | — |
| Room temp. × 120 Days: | | | | | | | |
| Change in Appearance | none | none | thickened | none | thickened | — | — |
| Viscosity (poise) | 5 | 13 | — | 2 | — | — | — |

TABLE 10

| | Aqueous Dispersion | | | |
|---|---|---|---|---|
| | B'-16 | B'-17 | B'-18 | B'-19 |
| Raw Materials: | | | | |
| Polyester Resin | A'-1 | A'-5 | A'-7 | A'-11 |
| Compound Having Protective Colloid Action (wt %[1]): | | | | |
| PVA | 0.10 | 0.030 | — | — |
| HEC[a] | — | — | — | 0.030 |
| PIA[b] | — | — | 0.10 | — |
| Characteristics of Aqueous Dispersion: | | | | |
| Solids Conc. (%) | 30.3 | 30.2 | 30.3 | 30.2 |
| Particle Size Distribution: | | | | |
| Number of Humps | 2 | 2 | 2 | 2 |
| Median Size ($\mu$m) | 0.99 | 0.62 | 0.98 | 0.75 |
| Maximum Size ($\mu$m) | 8.68 | 7.23 | 8.68 | 7.23 |
| Mode Size[c] ($\mu$m) | 0.89 | 0.62 | 0.89 | 0.74 |
| 80% Diameter ($\mu$m) | 2.33 | 0.96 | 2.32 | 1.52 |
| Spread[d] | 0.777 | 0.772 | 0.776 | 0.753 |

Notes in Table 9 and Table 10:
[a] HEC Daicel SP800 (produced by Daicel Chemical Industries, Ltd.)
[b] Polyitaconic acid PIA-728 (produced by Iwata Chemical Ltd.)
[c] Mode size of the hump on the finest particle side.
[d] log(90% Diameter/10% diameter)
[1] The numbers in Tables 9 and 10 indicate the weight that was used based on the polyester resin.

TABLE 11

| | Example No. | | | | | Comparative Example No. | | | |
|---|---|---|---|---|---|---|---|---|---|
| | 28 | 29 | 30 | 31 | 32 | 22 | 23 | 24 | 25 |
| Aqueous Dispersion | B'-1 | B'-2 | B'-7 | B'-9 | B'-12 | B'-16 | B'-17 | B'-18 | B'-19 |
| Peaks in Surface IR Spectrum, assigned to Polyester Resin Aqueous Dispersion: | | | | | | | | | |
| Ordinary State Adhesion (analysis on adhesive tape) | no peak | no peak | no peak | no peak | no peak | no peak | no peak | no peak | no peak |
| Coating Layer after Retort Treatment | peak appeared | peak appeared | peak appeared | peak appeared | peak appeared | peak appeared | peak appeared | peak appeared | no peak |
| Adhesion after Retort Treatment: | | | | | | | | | |
| Analysis on PET Film | peak appeared | peak appeared | peak appeared | peak appeared | peak appeared | peak appeared | no peak | peak appeared | — |

TABLE 11-continued

|  | Example No. |  |  |  |  | Comparative Example No. |  |  |  |
| --- | --- | --- | --- | --- | --- | --- | --- | --- | --- |
|  | 28 | 29 | 30 | 31 | 32 | 22 | 23 | 24 | 25 |
| Analysis on Adhesive Tape | no peak | no peak | no peak | no peak | no peak | peak appeared | peak appeared | peak appeared | — |

TABLE 12

|  | Example No. |  |  |  |  | Compara. Example No. |  |  |
| --- | --- | --- | --- | --- | --- | --- | --- | --- |
|  | 33 | 34 | 35 | 36 | 37 | 26 | 27 | 28 |
| Aqueous Dispersion | B'-4 | B'-5 | B'-7 | B'-8 | B'-12 | B'-16 | B'-17 | B'-18 |
| Smoothness | good | good | good | good | good | good | good | good |
| Processability | 1T | 2T | 0T | 0T | 1T | 1T | 3T | 1T |
| Solvent Resistance | >100 | 70–80 | >100 | >100 | >100 | >100 | 60–70 | >100 |
| Hot Water Resistance | 96 | 88 | 97 | 98 | 97 | 30–40 | 35–38 | 30–37 |

Comparative Examples 22 to 28 are shown for comparison in order to demonstrate that the various embodiments of the above-described third aspect of the present invention provide further excellent properties of the coating film obtained from the polyester resin aqueous dispersion (e.g., water resistance). That is, the embodiments of Comparative Examples 22 to 28 are also included in the above-described first aspect of the present invention directed to the polyester resin aqueous dispersion.

The polyester resin aqueous dispersion according to the present invention has the following advantages: (1) the polyester resin does not contain a special monomer component, or a structure which leaves an ionic group after drying, or an easily hydrolyzable structure; (2) the dispersion does not contain an externally added low molecular weight hydrophilic compound whose molecular weight is, in general, less than 1,000, such as a surfactant, and has organic solvent content which is sufficiently reduced to achieve the objects of the invention; (3) the dispersion exhibits extremely high storage stability even at a high solids concentration; (4) the dispersion has excellent film-forming properties; and (5) a coating film formed of the dispersion has excellent performance properties, such as processability, water resistance, corrosion resistance, chemical resistance, weather resistance and adhesion to various substrates. In particular, the polyester resin aqueous dispersion of the invention in which the polyester resin has an increased polydispersity index of molecular weight distribution (Mw/Mn) and a limited acid value, and which does not contain or contains a very small amount of a compound having a protective colloid action, is advantageous in that its coating film exhibits further improved water resistance as well as the above-mentioned characteristics.

Accordingly, the polyester resin aqueous dispersion of the invention is widely applicable as a binder in paints, adhesives, inks, fiber treating agents, paper coatings, and various other coating compositions.

Furthermore, when the method of the present invention is followed, the above-described polyester resin aqueous dispersion can be easily prepared without the need for special equipment or a complicated operation.

While the invention has been described in detail and with reference to specific embodiments thereof, it will be apparent to one skilled in the art that various changes and modifications can be made therein without departing from the spirit and scope thereof.

What is claimed is:

1. A polyester resin aqueous dispersion comprising:
   (A) a polyester resin comprising a polybasic acid and a polyhydric alcohol and having an acid value of 10 to 40 mg KOH/g, a weight average molecular weight of 9,000 or more or a relative viscosity of 1.20 or higher,
   (B) a basic compound,
   (C) an amphipathic organic solvent capable of plasticizing said polyester resin, in an amount of from 0.5 to 10% by weight based on said polyester resin aqueous dispersion,
   (D) a compound having a protective colloid action, in an amount of from 0.01 to 3% by weight based on said polyester resin, and (E) water
   wherein fine particles of said polyester resin are homogeneously dispersed in an aqueous medium.

2. The polyester resin aqueous dispersion according to claim 1, wherein said polyester resin particles have a particle size distribution such that the median size on the basis of volume is not greater than 2 $\mu$m and the maximum particle size does not exceed 10 $\mu$m.

3. The polyester resin aqueous dispersion according to claim 1, wherein said polyester resin particles have a particle size distribution such that the mode size, on the basis of volume, of the hump on the finest particle side of the particle size distribution is not greater than 1 $\mu$m and the 80% diameter does not exceed 4 $\mu$m.

4. The polyester resin aqueous dispersion according to claim 1, wherein said polyester resin particles have a particle size distribution such that the median size on the basis of volume is not greater than 2 $\mu$m, the mode size, on the basis of volume, of the hump on the finest particle side of the particle size distribution is not greater than 1 $\mu$m, and the particle size distribution satisfies the following relationship (1):

$$\log(90\% \text{ diameter}/10\% \text{ diameter}) \leq 1 \tag{1}$$

5. The polyester resin aqueous dispersion according to claim 1, wherein at least 50 mol % of said polybasic acid components constituting the polyester resin comprise aromatic polybasic acids, and the polyhydric alcohol component of said polyester resin mainly comprises at least one of ethylene glycol and neopentyl glycol.

6. The polyester resin aqueous dispersion according to claim 1, wherein at least 65 mol % of the polybasic acid components constituting said polyester resin comprise terephthalic acid.

7. The polyester resin aqueous dispersion according to claim 1, wherein said amphipathic organic solvent capable of plasticizing said polyester resin has:
   (1) in a molecule thereof, a hydrophobic structure comprising directly bonded 4 or more carbon atoms, and
   (2) at a molecular terminal thereof, a substituent containing at least one atom having a Pauling's electronegativity of 3.0 or more and exhibiting a polarity such that the carbon atom directly bonded to said atom having an electronegativity of 3.0 or more shows a chemical shift of 50 ppm or more in a $^{13}$C-NMR spectrum as measured in $CDCl_3$ at room temperature.

8. The polyester resin aqueous dispersion according to claim 1, wherein at least 65 mol % of the polybasic acid components constituting said polyester resin comprise terephthalic acid; and said amphipathic organic solvent capable of plasticizing said polyester resin has:
   (1) in a molecule thereof, a hydrophobic structure comprising directly bonded 4 or more carbon atoms, and
   (2) at a molecular terminal thereof, a substituent containing at least one atom having a Pauling's electronegativity of 3.0 or more and exhibiting a polarity such that the carbon atom directly bonded to said atom having an electronegativity of 3.0 or more shows a chemical shift of 50 ppm or more in a $^{13}$C-NMR spectrum as measured in $CDCl_3$ at room temperature.

9. A method for producing a polyester resin aqueous dispersion comprising the steps of:
   roughly dispersing in an aqueous medium the whole amount of (A) a polyester resin comprising a polybasic acid and a polyhydric alcohol and having an acid value of 10 to 40 mg KOH/g, a weight average molecular weight of 9,000 or more, or a relative viscosity of 1.20 or higher and the whole or a part of (B) a basic compound, (C) an amphipathic organic solvent capable of plasticizing said polyester resin, in an amount of from 0.5 to 10% by weight based on said polyester resin aqueous dispersion, and (D) a compound having a protective colloid action, in an amount of from 0.01 to 3% by weight based on said polyester resin,
   heating the system at a temperature ranging from (i) the higher of (i–1) the glass transition temperature of said polyester resin and (i7--2) 60° C. to (ii) 90° C. either after or while adding the rest of the components (B), (C) and (D) to the system while stirring, and
   continuing the stirring at the heating temperature for 15 to 120 minutes for emulsification.

10. A polyester resin aqueous dispersion comprising:
   (A') a polyester resin comprising a polybasic acid and a polyhydric alcohol and having an acid value of 8 to 36 mg KOH/g, a number average molecular weight of 4,000 or more, and a polydispersity index of not less than 4.0,
   (B) a basic compound,
   (C) an amphipathic organic solvent capable of plasticizing the polyester resin, in an amount of from 0.5 to 10% by weight based on said polyester resin and aqueous dispersion,
   (D') a compound having a protective colloid action, in an amount of 0.05% by weight or less based on said polyester resin, (E), water
   wherein fine particles of said polyester resin are homogeneously dispersed in an aqueous medium.

11. The polyester resin aqueous dispersion according to claim 10, wherein said polyester resin particles have a particle size distribution such that the median size on the basis of volume is not greater than 2 μm and the maximum particle size does not exceed 10 μm.

12. The polyester resin aqueous dispersion according to claim 10, wherein said polyester resin particles have a particle size distribution such that the mode size, on the basis of volume, of the hump on the finest particle side of the particle size distribution is not greater than 1 μm and the 80% diameter does not exceed 4 μm.

13. The polyester resin aqueous dispersion according to claim 10, wherein said polyester resin particles have a particle size distribution such that the median size on the basis of volume is not greater than 2 μm, the mode size, on the basis of volume, of the hump on the finest particle side of the particle size distribution is not greater than 1 μm, and the particle size distribution satisfies the following relationship (1):

$$\log(90\% \text{ diameter}/10\% \text{ diameter}) \leq 1 \tag{1}$$

14. The polyester resin aqueous dispersion according to claim 10, wherein at least 50 mol % of said polybasic acid components constituting the polyester resin comprise aromatic polybasic acids, and the polyhydric alcohol component of said polyester resin mainly comprises at least one of ethylene glycol and neopentyl glycol.

15. The polyester resin aqueous dispersion according to claim 10, wherein at least 65 mol % of the polybasic acid components constituting said polyester resin comprise terephthalic acid.

16. The polyester resin aqueous dispersion according to claim 10, wherein said amphipathic organic solvent capable of plasticizing said polyester resin has:
   (1) in a molecule thereof, a hydrophobic structure comprising directly bonded 4 or more carbon atoms, and
   (2) at a molecular terminal thereof, a substituent containing at least one atom having a Pauling's electronegativity of 3.0 or more and exhibiting a polarity such that the carbon atom directly bonded to said atom having an electronegativity of 3.0 or more shows a chemical shift of 50 ppm or more in a $^{13}$C-NMR spectrum as measured in $CDCl_3$ at room temperature.

17. The polyester resin aqueous dispersion according to claim 10, wherein at least 65 mol % of the polybasic acid components constituting said polyester resin comprise terephthalic acid; and said amphipathic organic solvent capable of plasticizing said polyester resin has:
   (1) in a molecule thereof, a hydrophobic structure comprising directly bonded 4 or more carbon atoms, and
   (2) at a molecular terminal thereof, a substituent containing at least one atom having a Pauling's electronegativity of 3.0 or more and exhibiting a polarity such that the carbon atom directly bonded to said atom having an electronegativity of 3.0 or more shows a chemical shift of 50 ppm or more in a $^{13}$C-NMR spectrum as measured in $CDCl_3$ at room temperature.

18. A method for producing a polyester resin aqueous dispersion comprising the steps of:
   roughly dispersing in an aqueous medium the whole amount of (A') a polyester resin comprising a polybasic acid and a polyhydric alcohol and having an acid value of 8 to 36 mg KOH/g, a number average molecular weight of 4,000 or more, and a polydispersity index of not less than 4.0 and the whole or a part of (B) a basic compound, (C) an amphipathic organic solvent capable of plasticizing the polyester resin, in an amount of from 0.5 to 10% by weight based on said polyester resin aqueous dispersion, and (D') a compound having a protective colloid action, in an amount of 0.05% by weight or less based on said polyester resin, heating the system at a temperature ranging from (i) the higher of (i-1) the glass transition temperature of said polyester resin and (i-2) 60° C. to (ii) 90° C. either after or while adding the rest of the components (B), (C) and (D') to the system while stirring, and continuing the stirring at the heating temperature for 15 to 120 minutes for emulsification.

19. The polyester resin aqueous dispersion according to claim 1, wherein the number average molecular weight of the compound having a protective colloid action is at least 2,500.

20. The polyester resin aqueous dispersion according to claim 10, wherein the number average molecular weight of the compound having a protective colloid action is at least 2,500.

* * * * *